US010935386B2

(12) United States Patent
Mori et al.

(10) Patent No.: US 10,935,386 B2
(45) Date of Patent: Mar. 2, 2021

(54) SELF-PROPELLED DEVICE, AND METHOD AND TRAVEL CONTROL COMPUTER PROGRAM OF CONTROLLING TRAVELING OF SELF-PROPELLED DEVICE

(71) Applicant: NSK LTD., Tokyo (JP)

(72) Inventors: Mayuko Mori, Kanagawa (JP); Masaaki Tanoue, Kanagawa (JP); Kazuteru Tobita, Kanagawa (JP); Satoshi Ozaki, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/610,319

(22) PCT Filed: Aug. 22, 2018

(86) PCT No.: PCT/JP2018/030957
§ 371 (c)(1),
(2) Date: Nov. 1, 2019

(87) PCT Pub. No.: WO2019/049664
PCT Pub. Date: Mar. 14, 2019

(65) Prior Publication Data
US 2020/0080850 A1 Mar. 12, 2020

(30) Foreign Application Priority Data

Sep. 8, 2017 (JP) .............................. JP2017-173389
Sep. 8, 2017 (JP) .............................. JP2017-173390

(51) Int. Cl.
*G05D 1/02* (2020.01)
*G01C 21/34* (2006.01)

(52) U.S. Cl.
CPC .............. *G01C 21/34* (2013.01); *G05D 1/02* (2013.01)

(58) Field of Classification Search
None
See application file for complete search history.

(56) References Cited

U.S. PATENT DOCUMENTS 5,568,030 A 10/1996 Nishikawa et al.
2017/0008521 A1* 1/2017 Braunstein ............. G01C 21/36
(Continued)

FOREIGN PATENT DOCUMENTS

JP 61-251911 A 11/1986
JP 2-311909 A 12/1990
(Continued)

OTHER PUBLICATIONS

International Search Report for PCT/JP2018/030957 dated, Nov. 6, 2018 (PCT/ISA/210).

*Primary Examiner* — James M McPherson
(74) *Attorney, Agent, or Firm* — Sughrue Mion, PLLC

(57) ABSTRACT

A self-propelled device, control method, and control program therefor are provided. The method and control program each include: position estimation; determining an intersection point of a virtual path connecting start and end points and a straight line passing through a position of the device, orthogonal to the virtual path; determining an offset reference point between the intersection point and the end point; determining at least each of two offset points offset on a corresponding goal point side or a start point side of the offset reference point on the virtual path; determining at least two target points reached by rotating the offset points by 90° about the offset reference point; and causing the device to travel toward the target points.

21 Claims, 50 Drawing Sheets

(56) References Cited

U.S. PATENT DOCUMENTS

2017/0371340 A1* 12/2017 Cohen ..................... G06T 7/73
2018/0101177 A1* 4/2018 Cohen ..................... H04N 7/181

FOREIGN PATENT DOCUMENTS

| JP | 2011-107984 A | 6/2011 |
| JP | 2012-094027 A | 5/2012 |
| JP | 2015-121928 A | 7/2015 |

* cited by examiner

FIG.5

|  | SET VALUE |
|---|---|
| A | (*,*) |
| B | (*,*) |
| TRAVELING PATH INFORMATION | +(-) |
| Vtp | ** |
| VoftL | ** |
| VoftR | ** |

FIG.28

| | SET VALUE |
|---|---|
| A | (*,*) |
| B | (*,*) |
| TRAVELING PATH INFORMATION | +(-) |
| Vtp | ** |
| VoftL | ** |

D1

SELF-PROPELLED DEVICE, AND METHOD AND TRAVEL CONTROL COMPUTER PROGRAM OF CONTROLLING TRAVELING OF SELF-PROPELLED DEVICE

CROSS REFERENCE TO RELATED APPLICATIONS

This application is a National Stage of International Application No. PCT/JP2018/030957 filed Aug. 22, 2018, claiming priority based on Japanese Patent Application No. 2017-173389, filed Sep. 8, 2017 and Japanese Patent Application No. 2017-173390, filed Sep. 8, 2017

FIELD

The present invention relates to a self-propelled device, a method of controlling traveling of the self-propelled device, and a computer program of controlling traveling of the self-propelled device.

BACKGROUND

An autonomous movable instrument such as an autonomous movable robot configured to autonomously move toward a set destination has been known. Map information of fields is input in advance to a self-propelled device provided to an autonomous movable instrument such as a stand-alone movable robot, and a path to the destination provided by connecting nodes set on a map is generated. For example, a disclosed control method performs image recognition of markers and follows the markers in a marker following area when a path to the destination is instructed in advance (for example, Patent Literature 1).

CITATION LIST

Patent Literature

Patent Literature 1: Japanese Patent Application Laid-open No. 2015-121928 A

SUMMARY

Technical Problem

For example, when a corridor is included in a movement path, an autonomous movable instrument purposed for indoor operations sets or generates the two paths of an outgoing path and a returning path in advance for traveling on the left side (or on the right side) of the corridor. However, when a plurality of paths are set or generated, a path of traveling on the left side (or on the right side) is not necessarily always selected, depending on the orientation and position of the autonomous movable instrument. Furthermore, the movement path to the destination is potentially made longer, which results in a detour.

The present invention is intended to solve the above-described problem and provide a self-propelled device capable of autonomously traveling on the left side or right side of one virtual path connecting two points, a method of controlling traveling of the self-propelled device, and a computer program of controlling traveling of the self-propelled device.

Solution to Problem

To achieve the above object, a method of controlling traveling of a self-propelled device according to one embodiment of the present invention capable of autonomously traveling from a predetermined start point to a predetermined goal point is disclosed. The method includes a first step of estimating the position of the self-propelled device, a second step of determining the intersection point of a virtual path and a straight line, the virtual path connecting the start point and the goal point, and the straight line passing through the position of the self-propelled device and which is orthogonal to the virtual path, a third step of determining an offset reference point between the intersection point and the goal point on the virtual path, a fourth step of determining at least an offset point at an offset on one of the goal point side and the start point side of the offset reference point on the virtual path, a fifth step of determining at least a target point reached by rotating the offset point by 90° about the offset reference point in one of the anticlockwise direction and the clockwise direction, and a sixth step of causing the self-propelled device to travel toward the target point.

With this configuration, it is possible to generate a traveling path at an offset on the left or on the right of one virtual path between two points without providing, for example, an outgoing path and a returning path.

As a desirable embodiment of the method of controlling traveling of the self-propelled device, it is preferable that the fifth step determines a target point reached by rotating the offset point by 90° about the offset reference point in the anticlockwise direction.

As a desirable embodiment of the method of controlling traveling of the self-propelled device, it is preferable that, when the self-propelled device is set in advance to travel on the left side of the virtual path, the fourth step determines at least a front-side offset point at an offset on the goal point side of the offset reference point on the virtual path, the fifth step determines a left target point reached by rotating the front-side offset point by 90° about the offset reference point in the anticlockwise direction, the sixth step causes the self-propelled device to travel toward the left target point.

With this configuration, it is possible to perform autonomous travel on a traveling path at an offset on the left of one virtual path.

As a desirable embodiment of the method of controlling traveling of the self-propelled device, it is preferable that, when the self-propelled device is set in advance to travel on the right side of the virtual path, the fourth step determines at least a back-side offset point at an offset on the start point side of the offset reference point on the virtual path, the fifth step determines a right target point reached by rotating the back-side offset point by 90° about the offset reference point in the anticlockwise direction, and the sixth step causes the self-propelled device to travel toward the right target point.

With this configuration, it is possible to perform autonomous travel on a traveling path at an offset on the right of one virtual path.

As a desirable embodiment of the method of controlling traveling of the self-propelled device, it is preferable that the distance from the offset reference point to the front-side offset point is equal to or smaller than the distance from the intersection point to the offset reference point on the virtual path.

Further, it is preferable that the distance from the offset reference point to the back-side offset point is equal to or smaller than the distance from the intersection point to the offset reference point on the virtual path.

As a desirable embodiment of the method of controlling traveling of the self-propelled device, it is preferable that the fourth step determines an offset point at an offset on the goal point side of the offset reference point on the virtual path.

As a desirable embodiment of the method of controlling traveling of the self-propelled device, it is preferable that, when the self-propelled device is set in advance to travel on the left side of the virtual path, the fifth step determines a left target point reached by rotating the offset point by 90° about the offset reference point in the anticlockwise direction, and the sixth step causes the self-propelled device to travel toward the left target point.

With this configuration, it is possible to perform autonomous travel on a traveling path at an offset on the left of one virtual path.

As a desirable embodiment of the method of controlling traveling of the self-propelled device, it is preferable that, when the self-propelled device is set in advance to travel on the right side of the virtual path, the fifth step determines a right target point reached by rotating the offset point by 90° about the offset reference point in the clockwise direction, and the sixth step causes the self-propelled device to travel toward the right target point.

With this configuration, it is possible to perform autonomous travel on a traveling path at an offset on the right of one virtual path.

As a desirable embodiment of the method of controlling traveling of the self-propelled device, it is preferable that the distance from the offset reference point to the offset point is equal to or smaller than the distance from the intersection point to the offset reference point on the virtual path.

Further, it is preferable that the offset reference point and the offset point converge to the goal point as the self-propelled device approaches the goal point.

With this configuration, the self-propelled device can reach the goal point while keeping an appropriate distance from the virtual path.

A self-propelled device according to one embodiment of the present invention capable of autonomously traveling from a predetermined start point to a predetermined goal point is disclosed. The self-propelled device includes a position estimation unit configured to estimate the position of the self-propelled device, a travel unit configured to move the self-propelled device, and a control unit configured to determine the intersection point of a virtual path and a straight line, the virtual path connecting the start point and the goal point, and the straight line passing through the position of the self-propelled device and which is orthogonal to the virtual path, determine an offset reference point between the intersection point and the goal point on the virtual path, determine at least an offset point at an offset on one of the goal point side and the start point side of the offset reference point on the virtual path, determine at least a target point reached by rotating the offset point by 90° about the offset reference point in one of the anticlockwise direction and the clockwise direction, and control the travel unit so that the self-propelled device travels toward the target point.

With this configuration, it is possible to generate a traveling path at an offset on the left or on the right of one virtual path without providing, for example, an outgoing path and a returning path between two points.

As a desirable embodiment of the self-propelled device, it is preferable that, when the self-propelled device is set in advance to travel on the left side of the virtual path, the control unit determines at least a front-side offset point at an offset on the goal point side of the offset reference point on the virtual path, determines a left target point reached by rotating the front-side offset point by 90° about the offset reference point in the anticlockwise direction, and controls the travel unit so that the self-propelled device travels toward the left target point.

With this configuration, the self-propelled device can autonomously travel on a traveling path at an offset on the left of one virtual path.

As a desirable embodiment of the self-propelled device, it is preferable that, when the self-propelled device is set in advance to travel on the right side of the virtual path, the control unit determines at least a back-side offset point at an offset on the start point side of the offset reference point on the virtual path, determines a right target point reached by rotating the back-side offset point by 90° about the offset reference point in the anticlockwise direction, and controls the travel unit so that the self-propelled device travels toward the right target point.

With this configuration, the self-propelled device can autonomously travel on a traveling path at an offset on the right of one virtual path.

As a desirable embodiment of the self-propelled device, it is preferable that the distance from the offset reference point to the front-side offset point is equal to or smaller than the distance from the intersection point to the offset reference point on the virtual path.

Further, it is preferable that the distance from the offset reference point to the back-side offset point is equal to or smaller than the distance from the intersection point to the offset reference point on the virtual path.

As a desirable embodiment of the self-propelled device, it is preferable that when the self-propelled device is set in advance to travel on the left side of the virtual path, the control unit determines an offset point at an offset on the goal point side of the offset reference point on the virtual path, determines a left target point reached by rotating the offset point by 90° about the offset reference point in the anticlockwise direction, and controls the travel unit so that the self-propelled device travels toward the left target point.

With this configuration, the self-propelled device can autonomously travel on a traveling path at an offset on the left of one virtual path.

As a desirable embodiment of the self-propelled device, it is preferable that when the self-propelled device is set in advance to travel on the right side of the virtual path, the control unit determines an offset point at an offset on the goal point side of the offset reference point on the virtual path, determines a right target point reached by rotating the offset point by 90° about the offset reference point in the clockwise direction, and controls the travel unit so that the self-propelled device travels toward the right target point.

With this configuration, the self-propelled device can autonomously travel on a traveling path at an offset on the right of one virtual path.

As a desirable embodiment of the self-propelled device, it is preferable that the distance from the offset reference point to the offset point is equal to or smaller than the distance from the intersection point to the offset reference point on the virtual path.

Further, it is preferable that the offset reference point and the offset point converge to the goal point as the self-propelled device approaches the goal point.

With this configuration, the self-propelled device can reach the goal point while keeping an appropriate distance from the virtual path.

As a desirable embodiment of the self-propelled device, it is preferable that the device further includes a path generation unit configured to generate the virtual path.

With this configuration, it is possible to set the virtual path by setting predetermined start and goal points.

As a desirable embodiment of the self-propelled device, it is preferable that the device further includes an operation unit used to set at least the start point and the goal point.

With this configuration, it is possible to set optional start and goal points.

A non-transitory computer readable recording medium storing therein a computer program executed by a computer to control traveling of a self-propelled device according to one embodiment of the present invention capable of autonomously traveling from a predetermined start point to a predetermined goal point is disclosed. The computer program includes a first step of estimating the position of the self-propelled device, a second step of determining the intersection point of a virtual path and a straight line, the virtual path connecting the start point and the goal point, and the straight line passing through the position of the self-propelled device and which is orthogonal to the virtual path, a third step of determining an offset reference point between the intersection point and the goal point on the virtual path, a fourth step of determining at least an offset point at an offset on one of the goal point side and the start point side of the offset reference point on the virtual path, a fifth step of determining at least a target point reached by rotating the offset point by 90° about the offset reference point in one of the anticlockwise direction and the clockwise direction, and a sixth step of causing the self-propelled device to travel toward the target point.

With this configuration, it is possible to generate a traveling path at an offset on the left or on the right of one virtual path without providing, for example, an outgoing path and a returning path between two points.

Advantageous Effects of Invention

The present invention provides a self-propelled device capable of autonomously traveling on the left side or right side of one virtual path connecting two points, a method of controlling traveling of the self-propelled device, and a computer program of controlling traveling of the self-propelled device.

BRIEF DESCRIPTION OF DRAWINGS

FIG. 5 is a diagram illustrating various kinds of exemplary information stored in a storage unit.

FIG. 28 is a diagram illustrating various kinds of exemplary information stored in the storage unit.

DESCRIPTION OF EMBODIMENTS

Embodiments for performing the invention (hereinafter simply referred to as embodiments) will be described below in detail with reference to the accompanying drawings. However, the present invention is not limited to the embodiments described below. Components in the embodiments below include components that could be easily thought of by the skilled person in the art, components identical in effect, and what is called equivalents. In addition, components disclosed in the embodiments below may be combined with each other as appropriate.

First Embodiment

Figure 1:
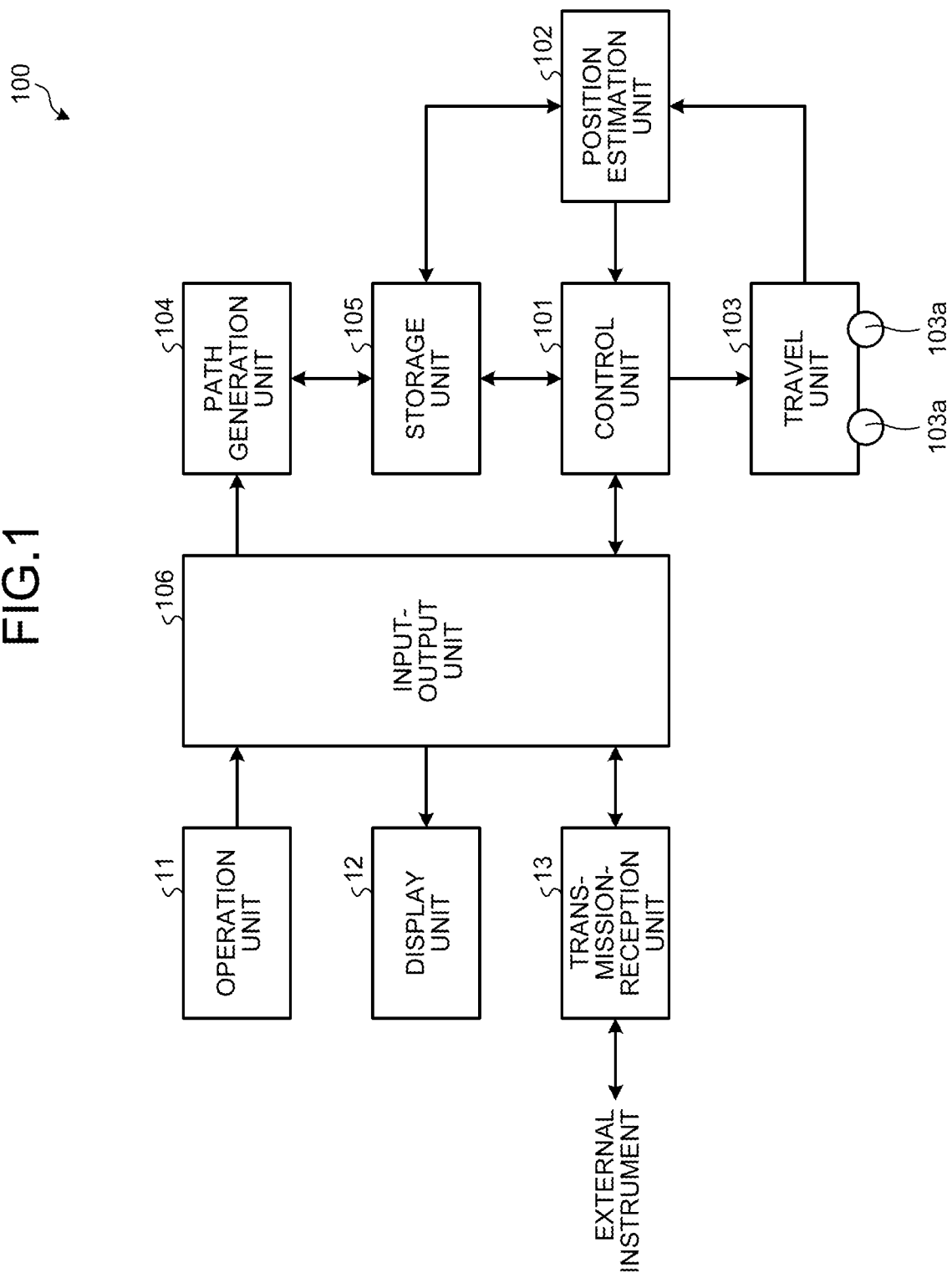
FIG. 1 is a diagram illustrating an exemplary self-propelled device according to a first embodiment.

FIG. 1 is a diagram illustrating an exemplary self-propelled device according to a first embodiment. Examples of this self-propelled device 100 include stand-alone movable robots such as a guide robot configured to guide people to facilities in a building such as a hospital, and a conveyance robot configured to convey components on, for example, a production line at a factory.

The self-propelled device 100 according to the present embodiment is a moving object configured to autonomously move toward a destination, and as illustrated in FIG. 1, includes an operation unit 11, a display unit 12, a transmission-reception unit 13, a control unit 101, a position estimation unit 102, a travel unit 103, a path generation unit 104, a storage unit 105, and an input-output unit 106. In the present embodiment, the operation unit 11, the display unit 12, the transmission-reception unit 13, the control unit 101, the position estimation unit 102, the path generation unit 104, the storage unit 105, and the input-output unit 106 are functional blocks achieved by, for example, components of a computer executing a travel control computer program according to the present embodiment. Alternatively, the operation unit 11, the display unit 12, the transmission-reception unit 13, the control unit 101, the position estimation unit 102, the path generation unit 104, the storage unit 105, and the input-output unit 106 may be, for example, individual circuits for achieving functions of travel control processing to be described later. The storage unit 105 may be a storage medium such as a hard disk drive, a flash memory, or an optical disk.

The operation unit 11 is a component through which an operator inputs information necessary for control of the self-propelled device 100. Examples of the operation unit 11 include a touch panel (not illustrated) through which the operator can input information by touching.

The display unit 12 displays a result of an operation of the operation unit 11 by the operator, and various kinds of information of the self-propelled device 100. Examples of the display unit 12 include a display device such as a liquid crystal panel. The display unit 12 may include the touch panel (not illustrated) described above to function as the operation unit 11.

The transmission-reception unit 13 has a function to receive various kinds of information transmitted from an external instrument (a terminal device such as a computer). The transmission-reception unit 13 also has a function to output various kinds of information of the self-propelled device 100 to the external instrument. The transmission-reception unit 13 may also have a function to receive various kinds of information transmitted from a remote controller (not illustrated) operated by the operator. Examples of the transmission-reception unit 13 include a wireless communication device configured to transmit and receive information by infrared or radio wave, and a wired communication device connected with the external instrument through a cable and configured to transmit and receive information between both ends of the cable.

The travel unit 103 is a movement mechanism for moving the self-propelled device 100. The travel unit 103 includes a wheel 103a that moves the self-propelled device 100, and a drive device (not illustrated) configured to drive the wheel 103a, and additionally includes a sensor (not illustrated) configured to detect the rotation angle of the wheel 103a. Examples of the sensor include a rotation angle sensor. The travel unit 103 moves the self-propelled device 100 by rotating the wheel 103a in accordance with a wheel rotation command value provided from the control unit 101.

The control unit 101 is a controller for controlling autonomous movement of the self-propelled device 100. The control unit 101 is, for example, a central processing unit (CPU) configured to achieve the travel control processing to be described later by executing the travel control computer program according to the present embodiment to be described later.

The control unit 101 controls the rotation angle of the wheel 103a of the travel unit 103 based on information input through the position estimation unit 102, the path generation unit 104, the storage unit 105, and the input-output unit 106. The control unit 101 has a function to store information input through the input-output unit 106 in the storage unit 105. The control unit 101 also has a function to output information through the input-output unit 106.

The position estimation unit 102 calculates a distance by which the self-propelled device 100 has traveled and the azimuth thereof based on information stored in the storage unit 105 and sensor information from the rotation angle sensor provided to the wheel 103a of the travel unit 103, and estimates the position of the self-propelled device 100. The position estimation unit 102 can be achieved by the travel control computer program executed by, for example, the CPU.

The path generation unit 104 has a function to receive a start point and a goal point of the self-propelled device 100 input through the input-output unit 106, generate a virtual path from the start point to the goal point, and store the generated virtual path in the storage unit 105. Examples of a path search algorithm used to generate the virtual path at the path generation unit 104 include an A-star (A*) algorithm, but the present embodiment is not limited to this path search algorithm. The virtual path generated by the path generation unit 104 may be a shortest path from the start point to the goal point, or a path in accordance with conditions acquired from map information stored in the storage unit 105. In the present embodiment, the virtual path is not a path on which the self-propelled device 100 actually travels but is a virtual path used as a reference to determine a left target point and a right target point in the travel control processing to be described later. The path generation unit 104 can be achieved by the travel control computer program executed by, for example, the CPU.

The storage unit 105 stores, in addition to the virtual path described above, information necessary for control of the self-propelled device 100, which is input to the control unit 101 through the input-output unit 106. Various kinds of information stored in the storage unit 105 will be described later.

The storage unit 105 also stores the travel control computer program according to the present embodiment. The storage unit 105 is, for example, a storage medium such as a hard disk drive or a flash memory. The storage medium in which the storage unit 105 is stored may be, for example, built in the self-propelled device 100, or may be a portable storage medium such as an optical disk or a universal serial bus (USB) memory. The present embodiment is not limited to the configuration of the storage unit 105.

The input-output unit 106 has a function to output, to the control unit 101 and the path generation unit 104, information input from the operation unit 11 and the transmission-reception unit 13, and output, to the display unit 12 and the transmission-reception unit 13, information input from the control unit 101.

Figure 2:
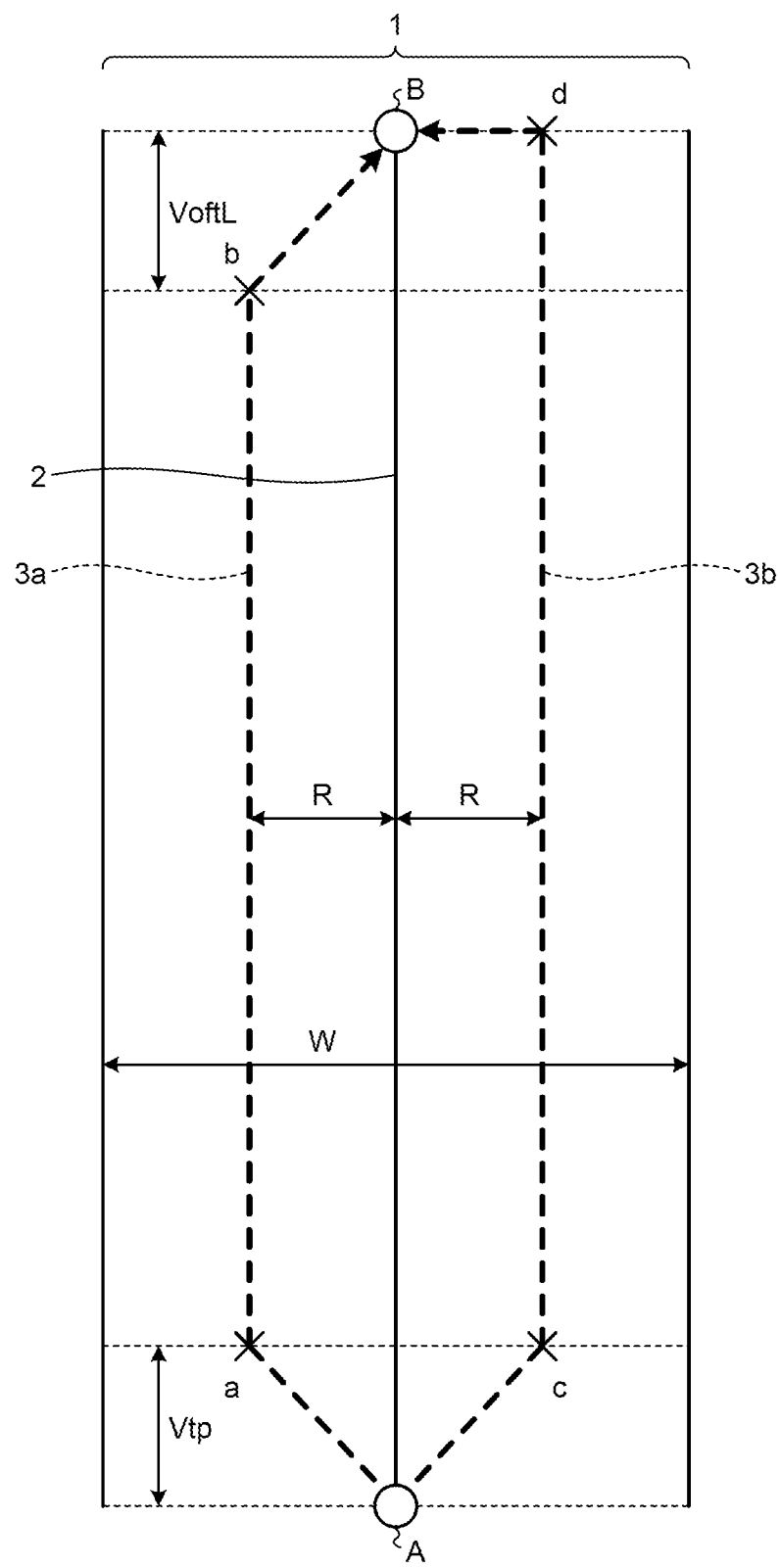
FIG. 2 is a schematic diagram of a region including a virtual path of the self-propelled device according to the first embodiment.

FIG. 2 is a schematic diagram of a region including the virtual path of the self-propelled device according to the first embodiment. The storage unit 105 stores a virtual path 2 generated by the path generation unit 104 (illustrated in FIG. 2). FIG. 2 illustrates an example in which a start point A and a goal point B are set at central parts of both ends of a corridor 1, respectively, and a straight line connecting the start point A and the goal point B is generated as the virtual path 2 of the self-propelled device 100. In FIG. 2, a solid line indicates the virtual path 2 of the self-propelled device 100, and dashed lines indicate exemplary loci 3a and 3b of target points of the self-propelled device 100. Although FIG. 2 illustrates the example in which, for simplification of the following description, the virtual path 2 of the self-propelled device 100 is set to be the straight line connecting the start point A and the goal point B, the virtual path 2 of the self-propelled device 100 is not limited thereto, and for example, the virtual path 2 of the self-propelled device 100 may be bent in accordance with the corridor 1 when the corridor 1 is bent, or the virtual path 2 may be curved in accordance with the corridor 1 when the corridor 1 is curved.

In the example illustrated in FIG. 2, the self-propelled device 100 according to the first embodiment travels toward a target point at an offset by an offset amount R on the left or on the right of the virtual path 2 generated by the path generation unit 104.

Figure 3:
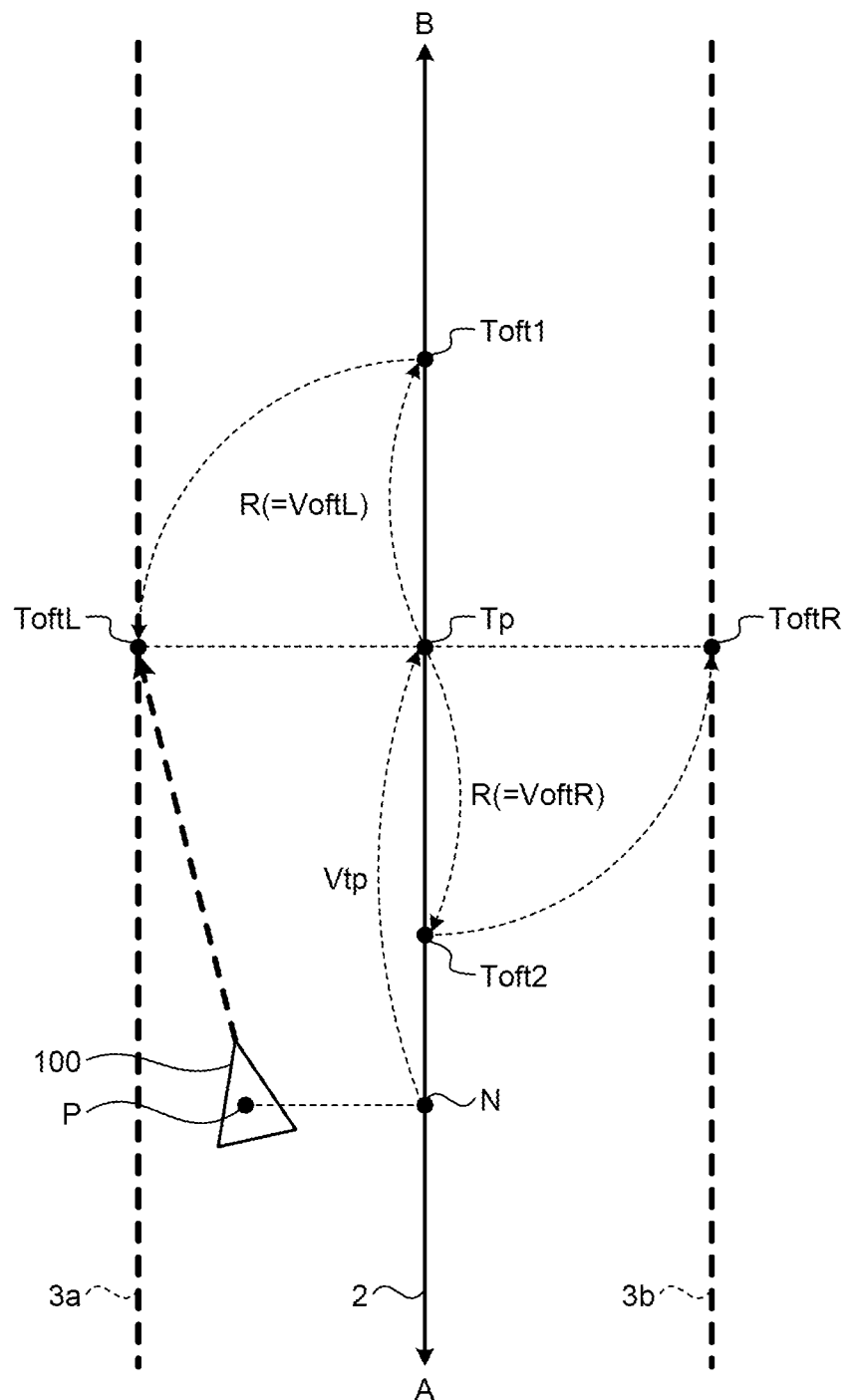
FIG. 3 is a conceptual diagram for describing a method of controlling traveling of the self-propelled device according to the first embodiment.
Figure 4:
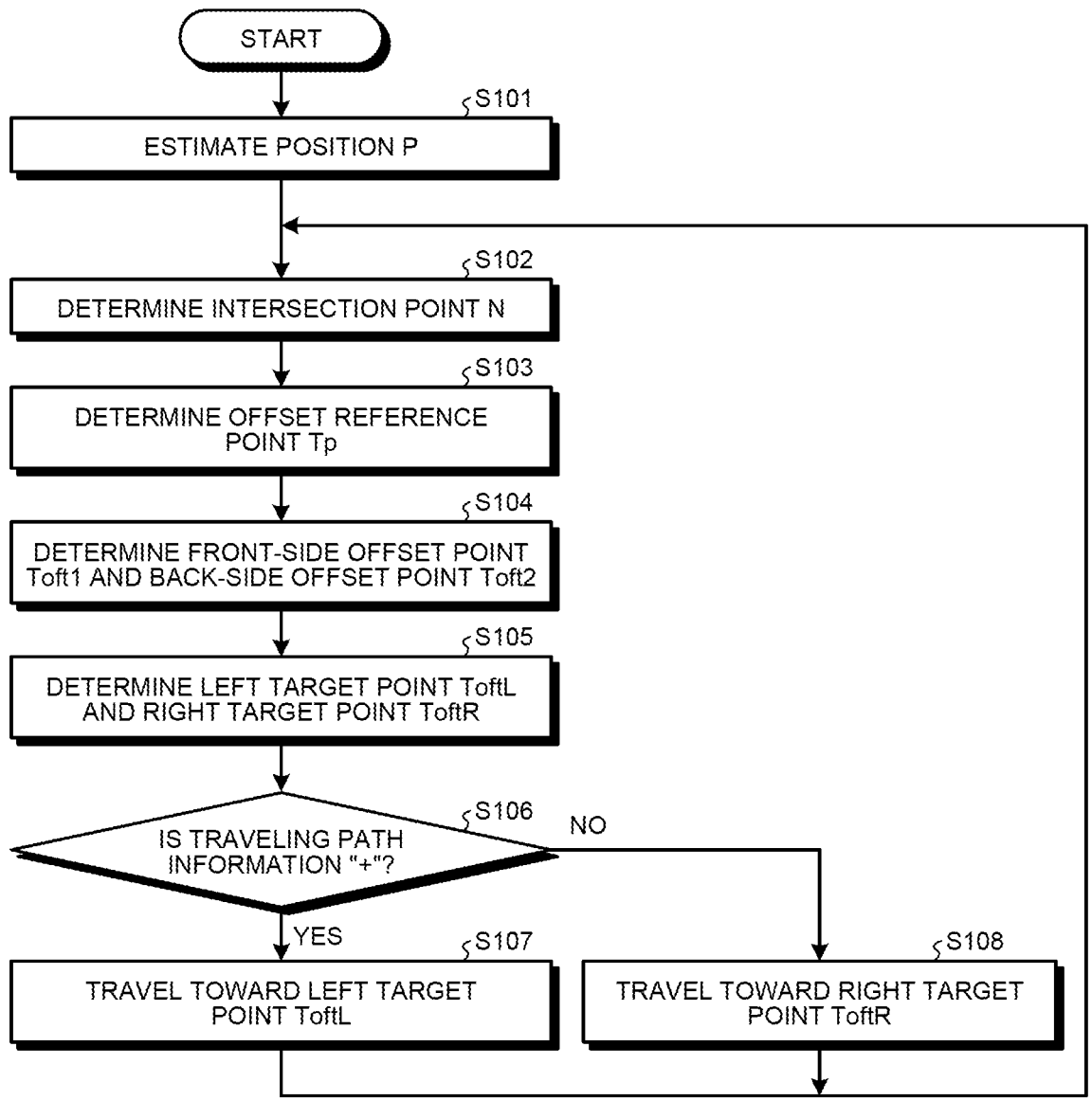
FIG. 4 is a flowchart illustrating exemplary travel control processing at the self-propelled device according to the first embodiment.

The following describes a basic exemplary operation when the loci 3a and 3b of the target points illustrated in FIG. 2 are target traveling paths of the self-propelled device 100 according to the first embodiment. FIG. 3 is a conceptual diagram for describing a method of controlling traveling of the self-propelled device according to the first embodiment. FIG. 4 is a flowchart illustrating exemplary travel control processing at the self-propelled device according to the first embodiment. FIG. 5 is a diagram illustrating various kinds of exemplary information stored in the storage unit.

FIG. 3 illustrates an example in which the self-propelled device 100 is on the left side of the virtual path 2. FIG. 5 illustrates an example in which, in addition to the above-described virtual path 2, the storage unit 105 stores, as various kinds of information D1 necessary for control of the self-propelled device 100, position information of the start point A, position information of the goal point B, traveling path information, an initial value Vtp of the distance from an intersection point N to an offset reference point, a first initial offset amount VoftL, and a second initial offset amount VoftR.

For example, the position information of the start point A and the goal point B stored in the storage unit 105 is input from the operation unit 11 and stored as coordinate information in a region including the virtual path 2.

In the present embodiment, as in the example illustrated in FIG. 5, the traveling path information stored in the storage unit 105 is set to be "+ (plus, positive)" when traveling is made on the left side of the virtual path 2 or "− (minus, negative)" when traveling is made on the right side of the virtual path 2.

The storage unit 105 also stores the initial value Vtp of the distance between the intersection point N of the virtual path 2 and a straight line passing through the position of the self-propelled device 100 and which is orthogonal to the virtual path 2 and an offset reference point Tp provided before the goal point B. The initial value Vtp is assumed to be, for example, 2 m approximately. In the present embodiment, for example, the initial value Vtp is input through the transmission-reception unit 13 and the input-output unit 106 in advance and stored in the storage unit 105 as a discrete value such as numerical data or digital data by the control unit 101. Alternatively, for example, the initial value Vtp may be changed in accordance with the speed of the self-propelled device 100 by the control unit 101. In this case, speed information of the self-propelled device 100 may be included in the various kinds of information D1 stored in the storage unit 105. The present embodiment is not limited to this method of setting the initial value Vtp.

The storage unit 105 also stores the first initial offset amount VoftL as the initial value of the offset amount R to the locus 3a of the left target point when traveling is made on the left side of the virtual path 2, and the second initial offset amount VoftR as the initial value of the offset amount R to the locus 3b of the right target point when traveling is made on the right side of the virtual path 2.

In the present embodiment, for example, the first initial offset amount VoftL and the second initial offset amount VoftR are input through the transmission-reception unit 13 and the input-output unit 106 in advance and stored in the storage unit 105 as discrete values such as numerical data or digital data by the control unit 101. Alternatively, for example, the path generation unit 104 may set the first initial offset amount VoftL and the second initial offset amount VoftR based on the map information stored in the storage unit 105. In this case, the setting may be performed in accordance with various conditions including the width of the corridor 1. Alternatively, the setting may be performed while taking into account clearance when a plurality of self-propelled devices 100 pass by at the corridor 1. More specifically, the first initial offset amount VoftL and the second initial offset amount VoftR can each take, for example, the maximum value of W/2 when W represents the width of the corridor 1, but preferably each take a value smaller than W/2, for example, W/4 when the width W of the corridor 1 is restricted by a wall surface. Moreover, each initial offset amount may be, for example, W/8 or 3W/8 when a plurality of self-propelled devices 100 travel side by side on the left side or the right side of the virtual path 2. The present embodiment is not limited to this method of setting the first initial offset amount VoftL and the second initial offset amount VoftR.

In the present embodiment, the initial value Vtp of the distance from the intersection point N to the offset reference point Tp on the virtual path 2, the first initial offset amount VoftL, and the offset amount R satisfy Condition expression (1) below.

$$Vtp \geq VoftL \geq R \quad (1)$$

In addition, in the present embodiment, the initial value Vtp of the distance from the intersection point N to the offset reference point Tp on the virtual path 2, the second initial offset amount VoftR, and the offset amount R satisfy Condition expression (2) below.

$$Vtp \geq VoftR \geq R \quad (2)$$

In addition, in the present embodiment, the first initial offset amount VoftL and the second initial offset amount VoftR of the offset amount R satisfy Condition expression (3) below.

$$VoftL = VoftR \quad (3)$$

In the present embodiment, the travel control processing at the self-propelled device 100 according to the first embodiment is performed through execution of the travel control computer program stored in the storage unit 105.

First, the position estimation unit 102 estimates the position P of the self-propelled device 100 (step S101).

The control unit 101 determines the intersection point N of the virtual path 2 and the straight line passing through the position P of the self-propelled device 100 and which is orthogonal to the virtual path 2 (step S102).

Subsequently, the control unit 101 determines the offset reference point Tp separated by the initial value Vtp on the goal point B side from the intersection point N on the virtual path 2 (step S103).

Subsequently, the control unit 101 determines a front-side offset point Toft1 at an offset by the offset amount R (in this example, the first initial offset amount VoftL) on the goal point B side from the offset reference point Tp on the virtual path 2, and determines a back-side offset point Toft2 at an offset by the offset amount R (in this example, the second initial offset amount VoftR) on the start point A side from the offset reference point Tp on the virtual path 2 (step S104).

Subsequently, the control unit 101 determines a left target point ToftL reached by rotating the front-side offset point Toft1 by 90° about the offset reference point Tp in the anticlockwise direction, and determines a right target point ToftR reached by rotating the back-side offset point Toft2 by 90° about the offset reference point Tp in the anticlockwise direction (step S105).

Then, the control unit 101 determines whether the traveling path information is "+ (plus, positive)", in other words, whether traveling is set to be made on the left side of the virtual path 2 (step S106).

When the traveling path information is "+(plus, positive)" (Yes at step S106), the control unit 101 controls the rotation angle of the wheel 103a of the travel unit 103 so that traveling is made toward the left target point ToftL (step S107), and then returns to step S102.

When the traveling path information is "− (minus, negative)" (No at step S106), the control unit 101 controls the rotation angle of the wheel 103a of the travel unit 103 so that traveling is made toward the right target point ToftR (step S108), and then returns to step S102.

The following describes, with reference to FIGS. 6 to 16, an example in which the self-propelled device 100 autonomously travels on the left side of the virtual path 2, in other words, autonomously travels on a target traveling path set to the locus 3a of the target point illustrated in FIG. 2.

Figure 6:
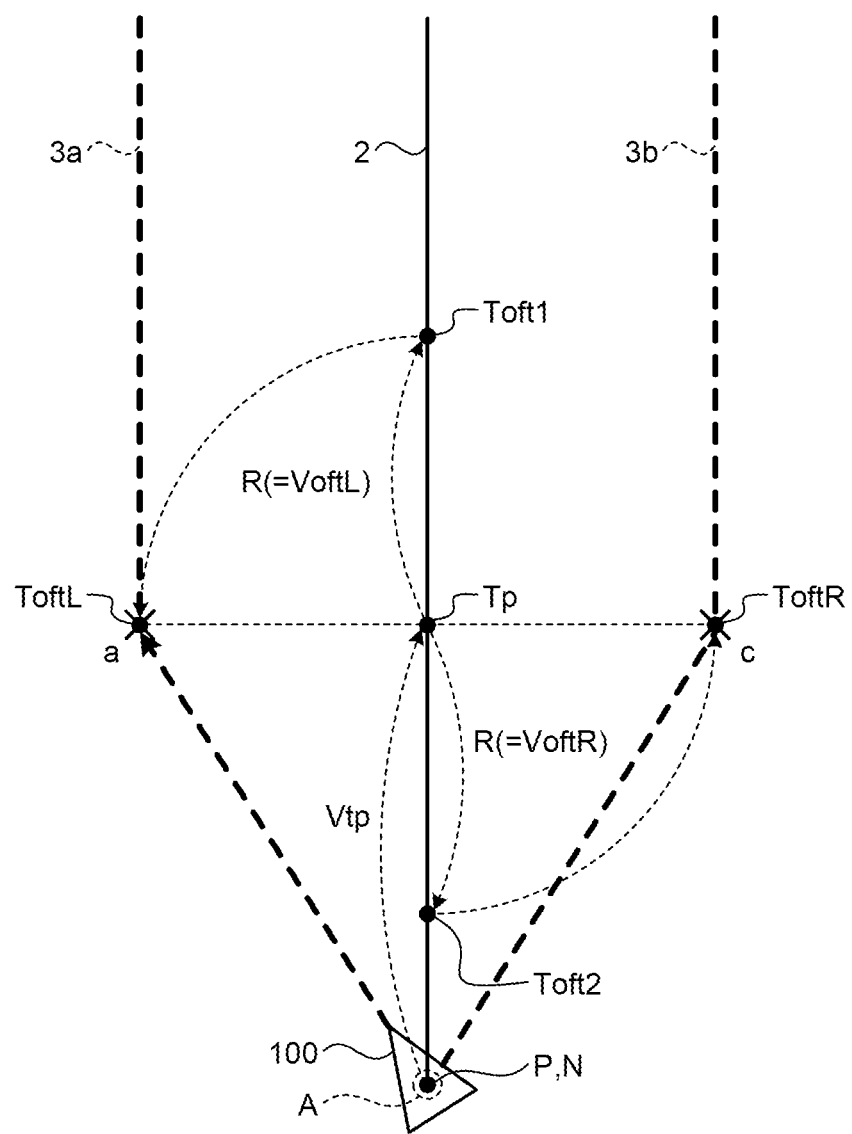
FIG. 6 is a conceptual diagram when the position P of the self-propelled device according to the first embodiment coincides with a start point A.
Figure 7:
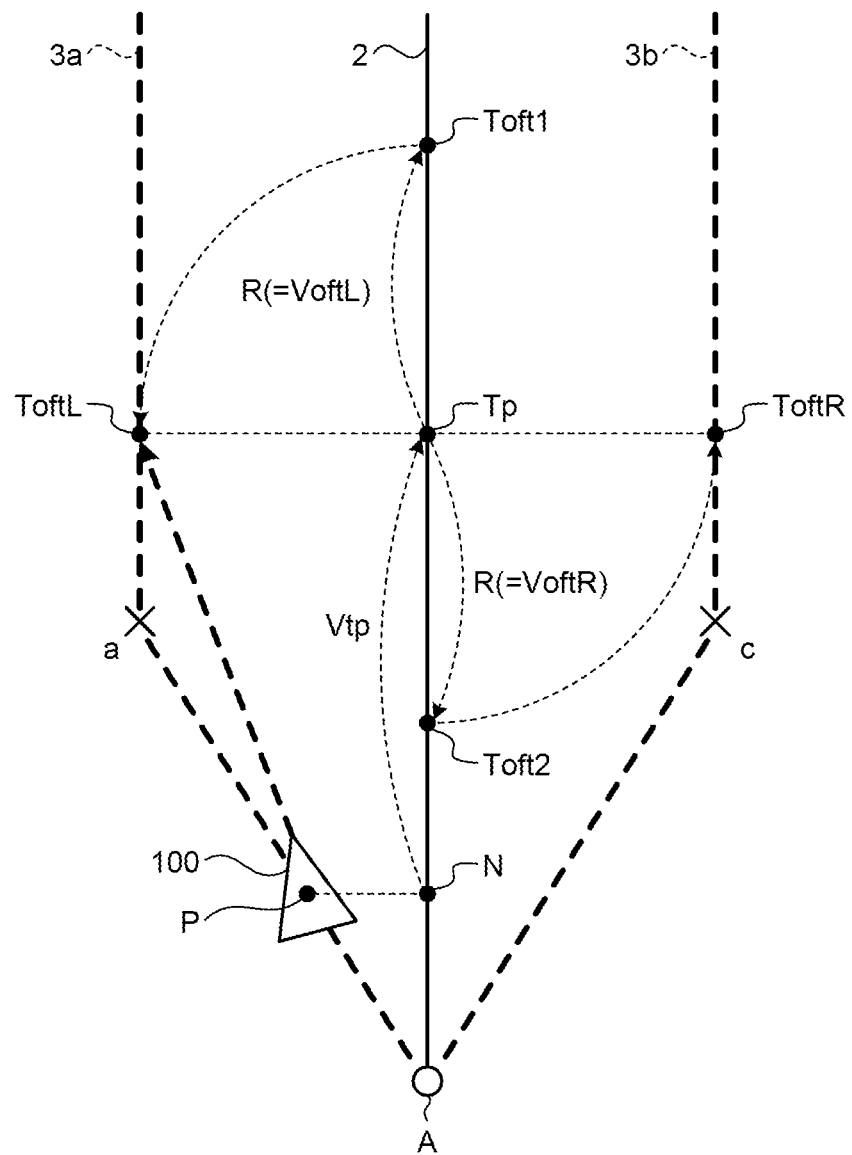
FIG. 7 is a conceptual diagram when the position P of the self-propelled device according to the first embodiment is ahead of the position illustrated in FIG. 6.
Figure 8:
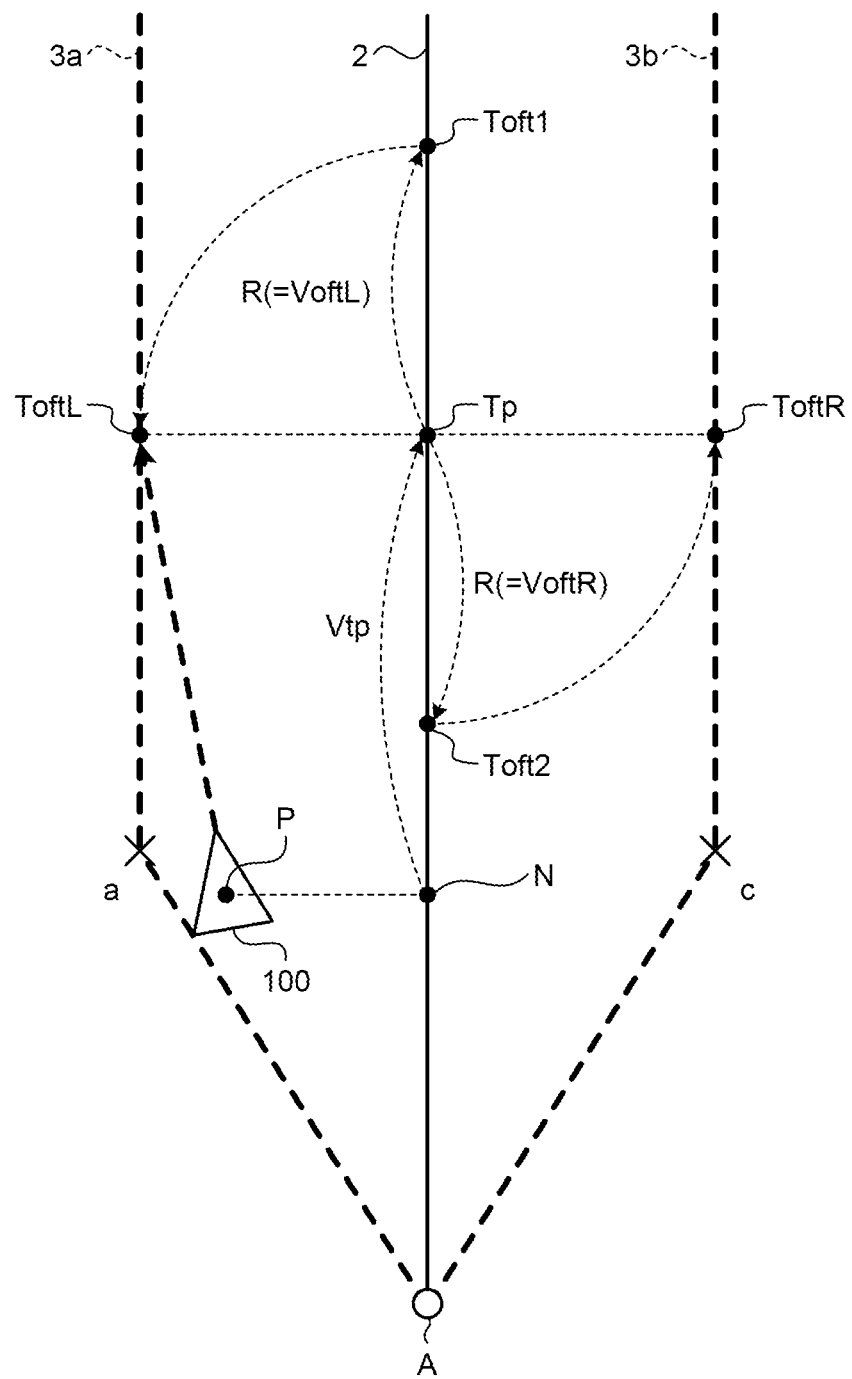
FIG. 8 is a conceptual diagram when the position P of the self-propelled device according to the first embodiment is further ahead of the position illustrated in FIG. 7.
Figure 9:
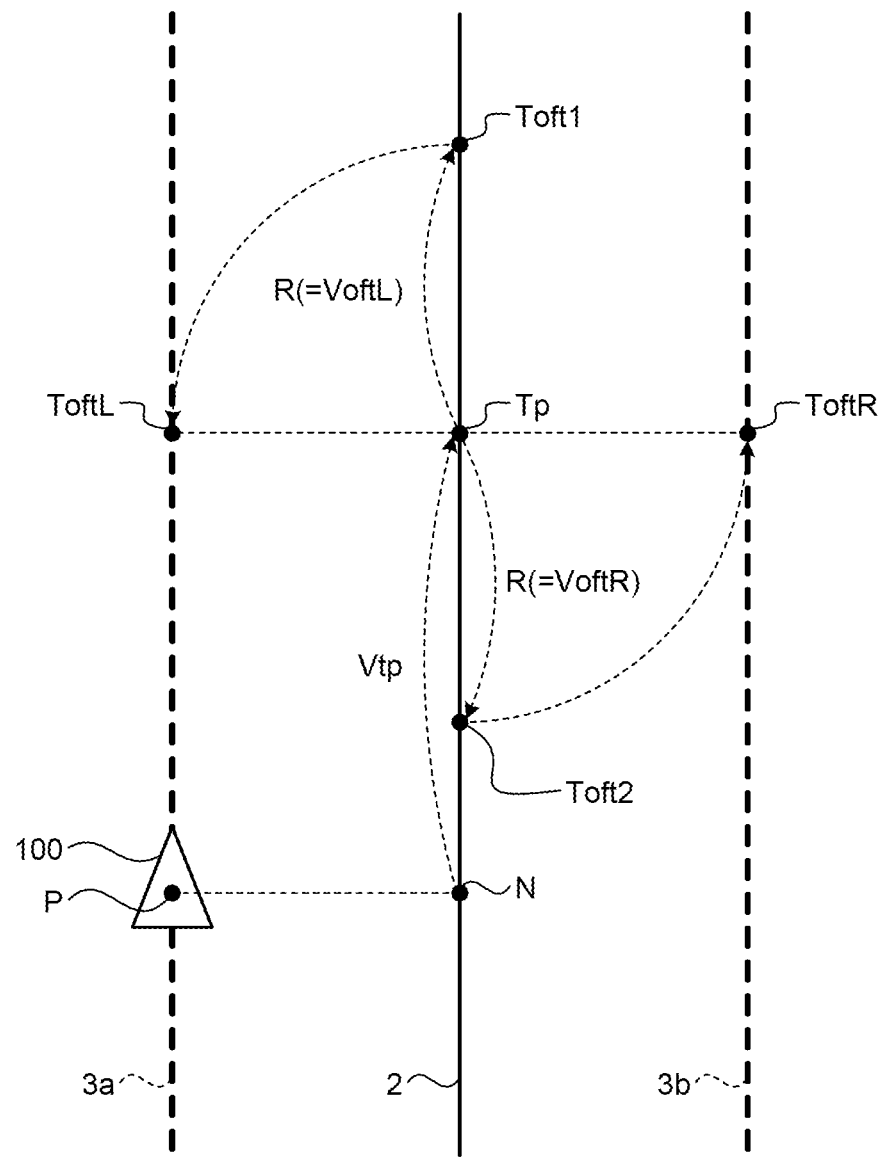
FIG. 9 is a conceptual diagram when the self-propelled device according to the first embodiment is in a predetermined zone of a straight region from Position a to Position b illustrated in FIG. 2.

FIG. 6 is a conceptual diagram when the position P of the self-propelled device according to the first embodiment coincides with the start point A. FIG. 7 is a conceptual diagram when the position P of the self-propelled device according to the first embodiment is ahead of the position illustrated in FIG. 6. FIG. 8 is a conceptual diagram when the position P of the self-propelled device according to the first embodiment is further ahead of the position illustrated in FIG. 7. FIG. 9 is a conceptual diagram when the self-propelled device according to the first embodiment is in a predetermined zone of a straight region from Position a to Position b illustrated in FIG. 2.

As illustrated in FIG. 6, when the position P of the self-propelled device 100 coincides with the start point A, the left target point ToftL coincides with Position a. In other words, the distance on the virtual path 2 from the start point A to the intersection point of the virtual path 2 and a straight line passing through Position a and which is orthogonal to the virtual path 2 is equal to the initial value Vtp (refer to FIG. 2). As illustrated in FIGS. 7 and 8, the left target point ToftL moves on a straight line connecting Position a and Position b as the position P of the self-propelled device 100 separates from the start point A, and accordingly, the position P of the self-propelled device 100 converges to the locus 3a of the target point, and as illustrated in FIG. 9, the position P of the self-propelled device 100 is on the locus 3a of the target point in the straight region from Position a to Position b.

Figure 10:
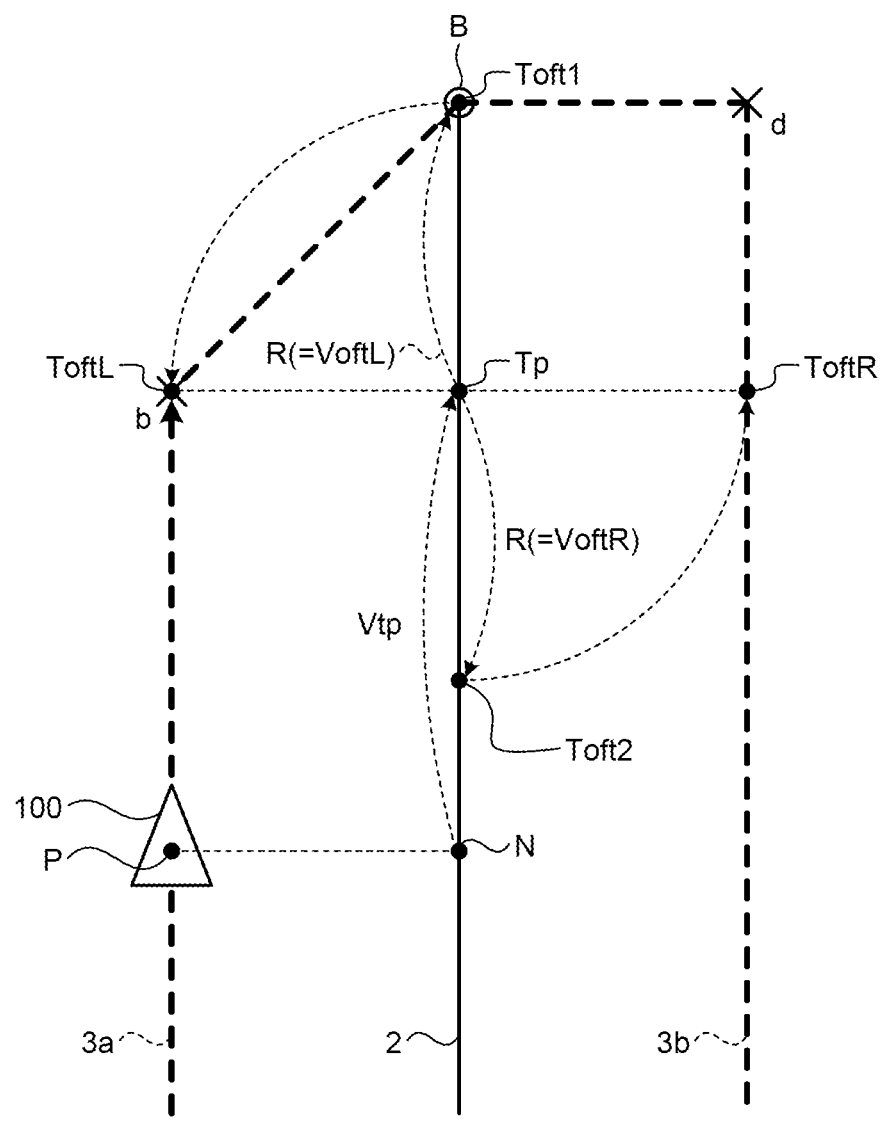
FIG. 10 is a conceptual diagram when a front-side offset point Toft1 of the self-propelled device according to the first embodiment coincides with a goal point B.
Figure 11:
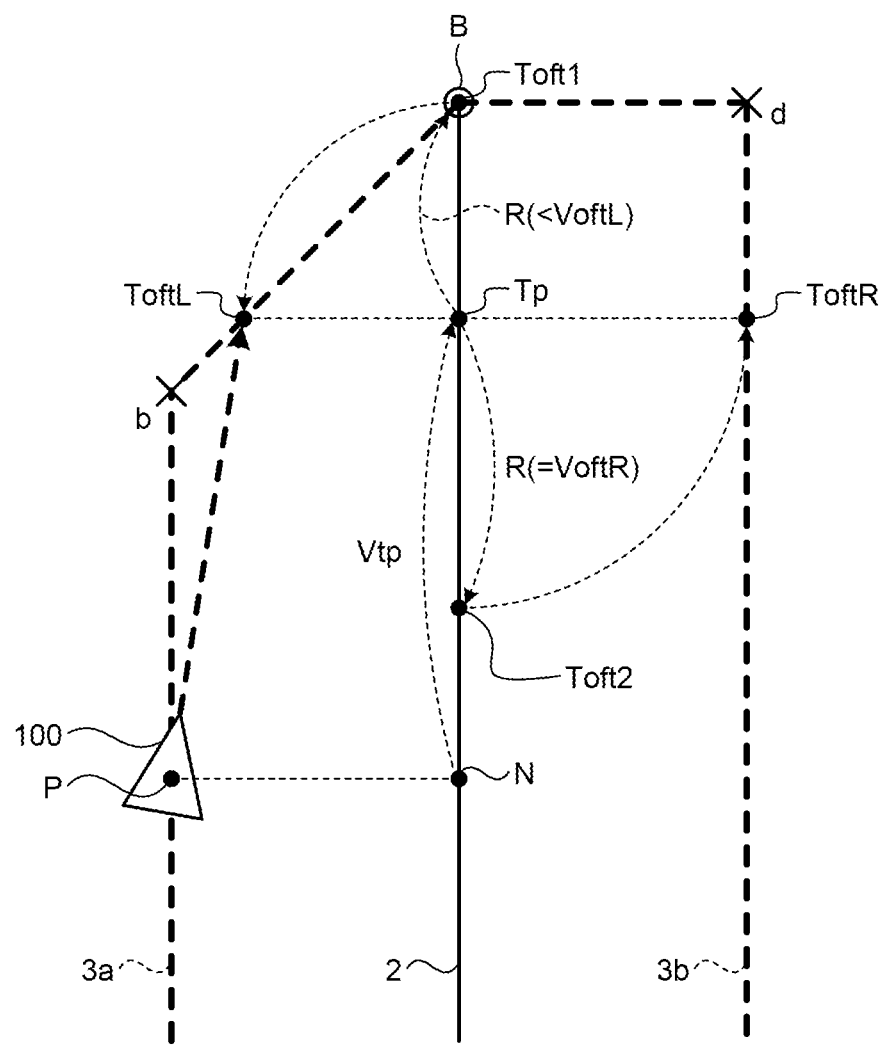
FIG. 11 is a conceptual diagram when the position P of the self-propelled device according to the first embodiment is ahead of the position illustrated in FIG. 10.
Figure 12:
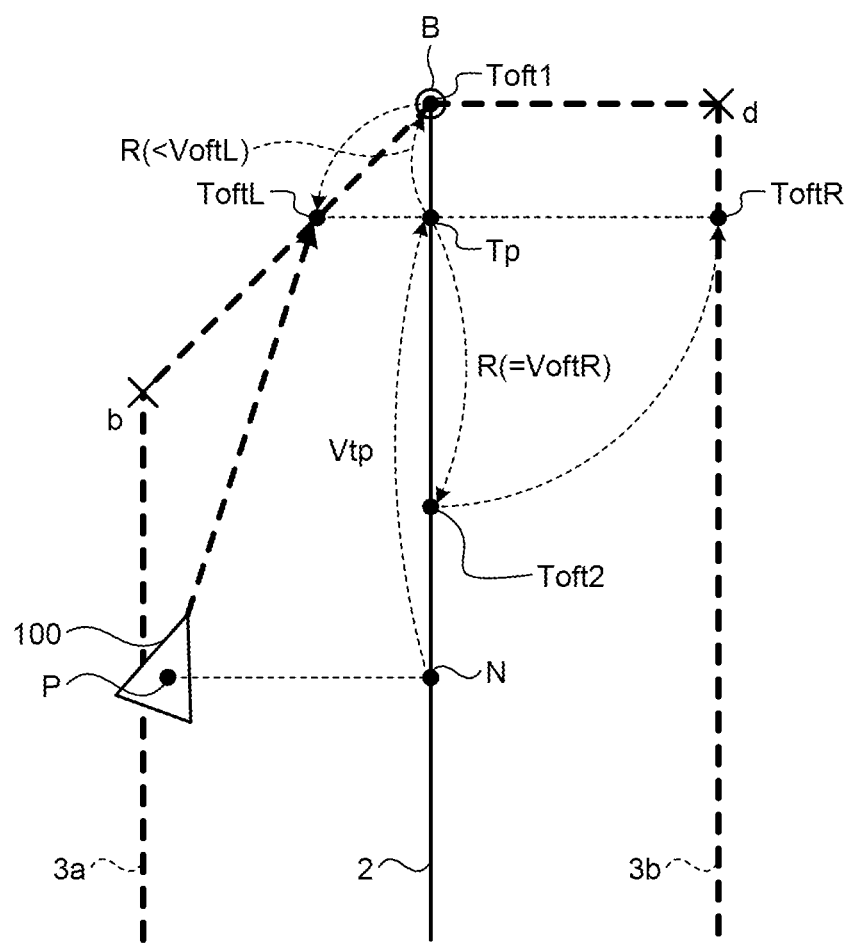
FIG. 12 is a conceptual diagram when the position P of the self-propelled device according to the first embodiment is further ahead of the position illustrated in FIG. 11.
Figure 13:
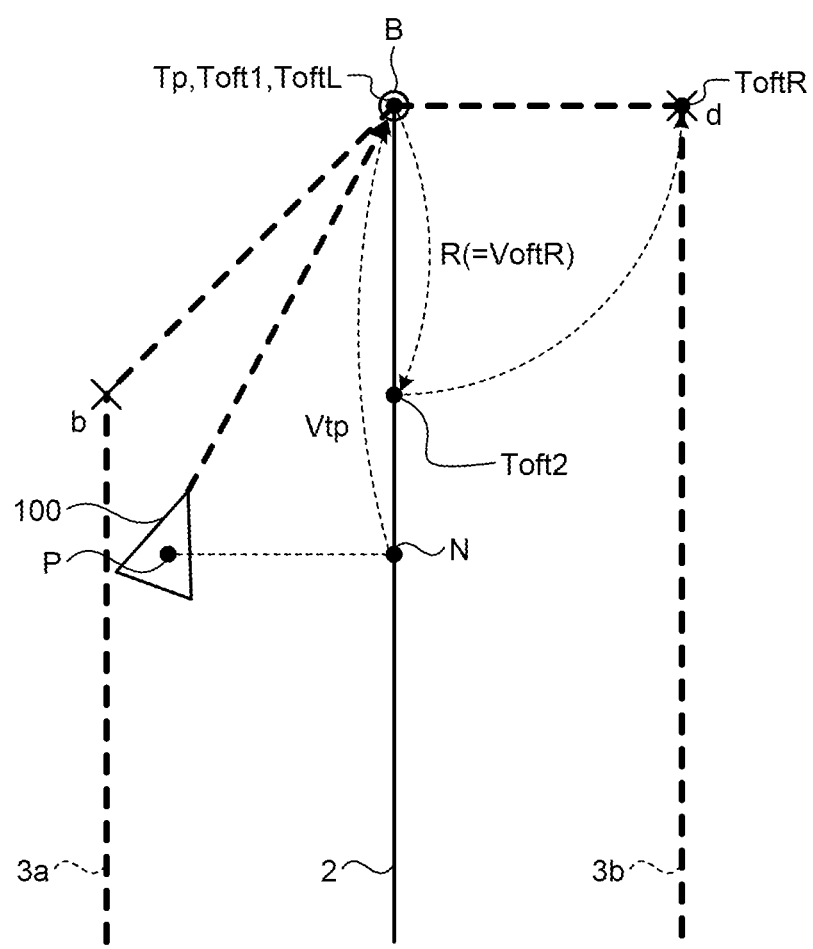
FIG. 13 is a conceptual diagram when an offset reference point Tp of the self-propelled device according to the first embodiment coincides with the goal point B.
Figure 14:
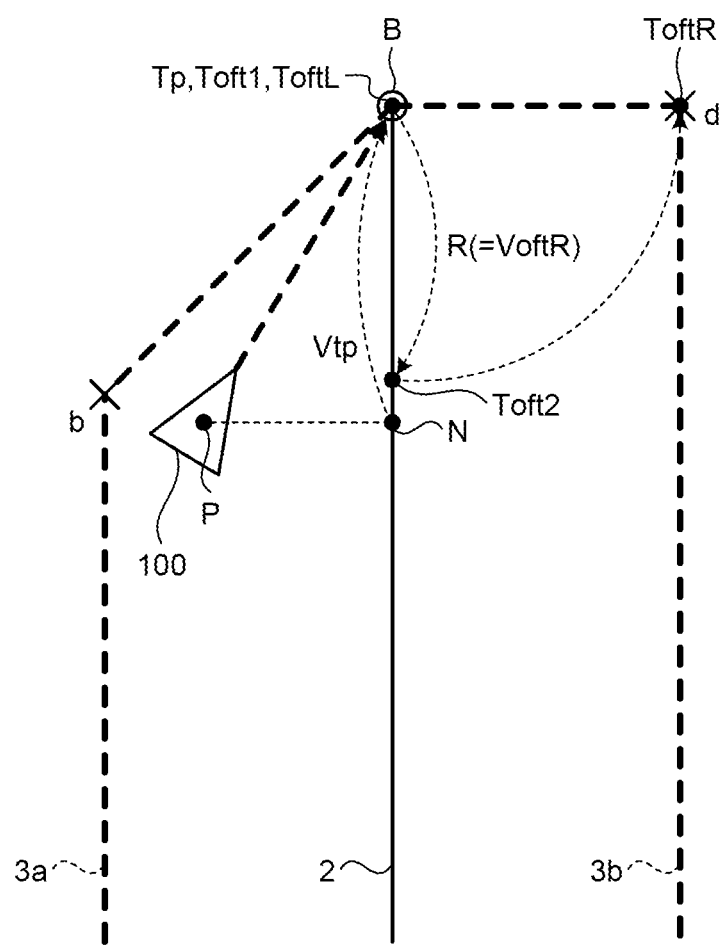
FIG. 14 is a conceptual diagram when the position P of the self-propelled device according to the first embodiment is ahead of the position illustrated in FIG. 13.
Figure 15:
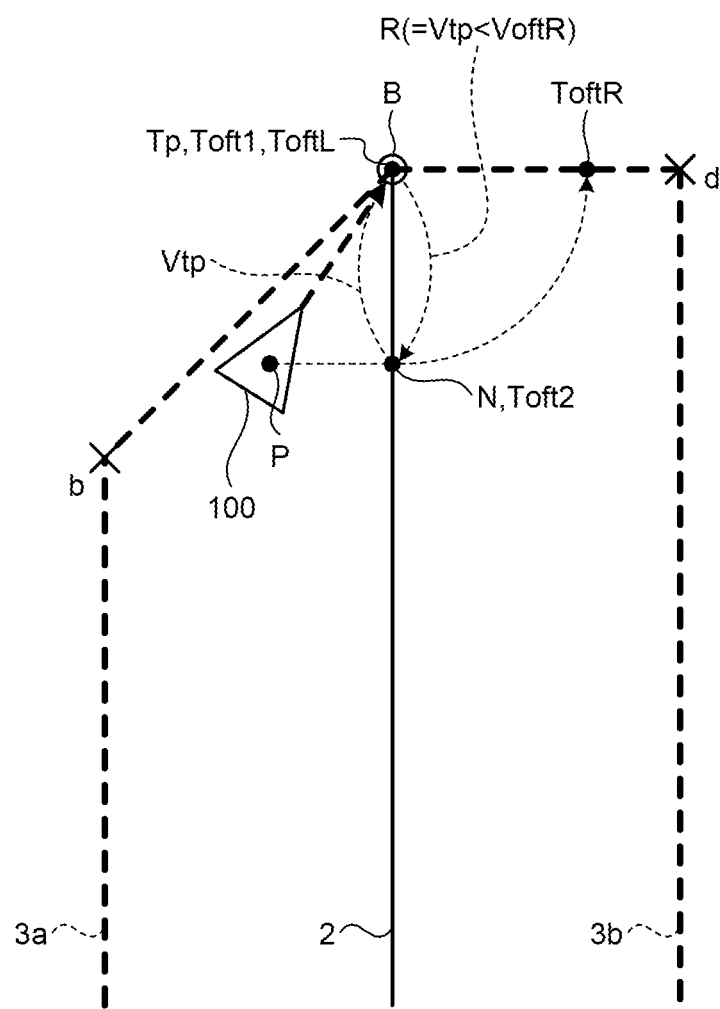
FIG. 15 is a conceptual diagram when the position P of the self-propelled device according to the first embodiment is further ahead of the position illustrated in FIG. 14.
Figure 16:
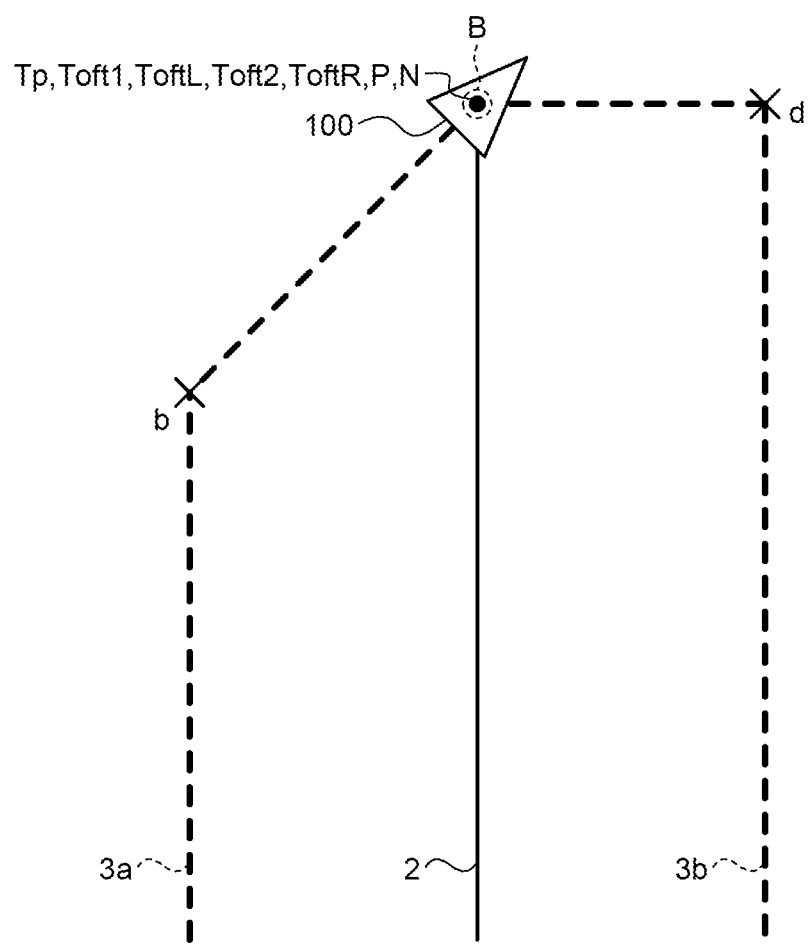
FIG. 16 is a conceptual diagram when the position P of the self-propelled device according to the first embodiment coincides with the goal point B.

FIG. 10 is a conceptual diagram when the front-side offset point Toft1 of the self-propelled device according to the first embodiment coincides with the goal point B. FIG. 11 is a conceptual diagram when the position P of the self-propelled device according to the first embodiment is ahead of the position illustrated in FIG. 10. FIG. 12 is a conceptual diagram when the position P of the self-propelled device according to the first embodiment is further ahead of the position illustrated in FIG. 11. FIG. 13 is a conceptual diagram when the offset reference point Tp of the self-propelled device according to the first embodiment coincides with the goal point B. FIG. 14 is a conceptual diagram when the position P of the self-propelled device according to the first embodiment is ahead of the position illustrated in FIG. 13. FIG. 15 is a conceptual diagram when the position P of the self-propelled device according to the first embodiment is further ahead of the position illustrated in FIG. 14. FIG. 16 is a conceptual diagram when the position P of the self-propelled device according to the first embodiment coincides with the goal point B.

As illustrated in FIG. 10, when the front-side offset point Toft1 of the self-propelled device 100 coincides with the goal point B, the left target point ToftL coincides with Position b. In other words, the distance on the virtual path 2 from the goal point B to the intersection point of the virtual path 2 and a straight line passing through Position b and which is orthogonal to the virtual path 2 is equal to the first initial offset amount VoftL (refer to FIG. 2).

The front-side offset point Toft1, the offset reference point Tp, and the back-side offset point Toft2 converge to the goal point B. In other words, as illustrated in FIGS. 11 and 12, Expression (1) described above indicates that, after the distance between the offset reference point Tp and the goal point B becomes smaller than the first initial offset amount VoftL (R<VoftL), the locus 3a of the left target point ToftL moves on a straight line connecting Position b and the goal point B, and when the offset reference point Tp coincides with the goal point B, the left target point ToftL coincides with the goal point B as illustrated in FIG. 13. Thereafter, the position P of the self-propelled device 100 approaches the left target point ToftL at the goal point B as illustrated in FIGS. 14 and 15, the position P of the self-propelled device 100 coincides with the goal point B as illustrated in FIG. 16, and the self-propelled device 100 stops.

In this manner, the self-propelled device 100 according to the first embodiment can constantly travel on the left side of the virtual path 2 from the start point A to the goal point B and reach the goal point B.

In the above-described example, the back-side offset point Toft2 and the right target point ToftR are determined, but no back-side offset point Toft2 nor right target point ToftR may be determined when the self-propelled device 100 is set in advance to travel on the left side of the virtual path 2. In other words, the locus 3b of the right target point ToftR, which is illustrated in FIGS. 6 to 16, is not necessarily needed when traveling is set to be made on the left side of the virtual path 2.

The following describes, with reference to FIGS. 17 to 24, an example in which the self-propelled device 100 autonomously travels on the right side of the virtual path 2, in other words, autonomously travels on a target traveling path set to the locus 3b of the target point illustrated in FIG. 2.

Figure 17:
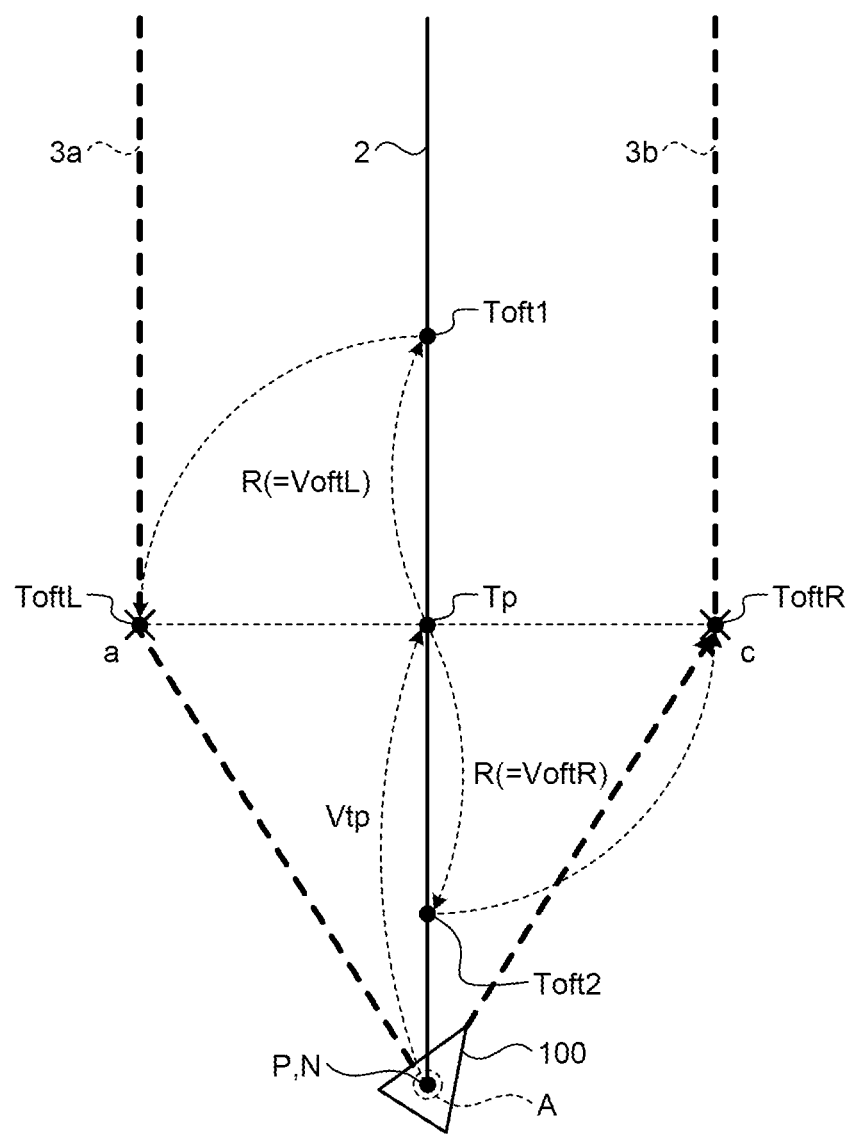
FIG. 17 is a conceptual diagram when the position P of the self-propelled device according to the first embodiment coincides with the start point A.
Figure 18:
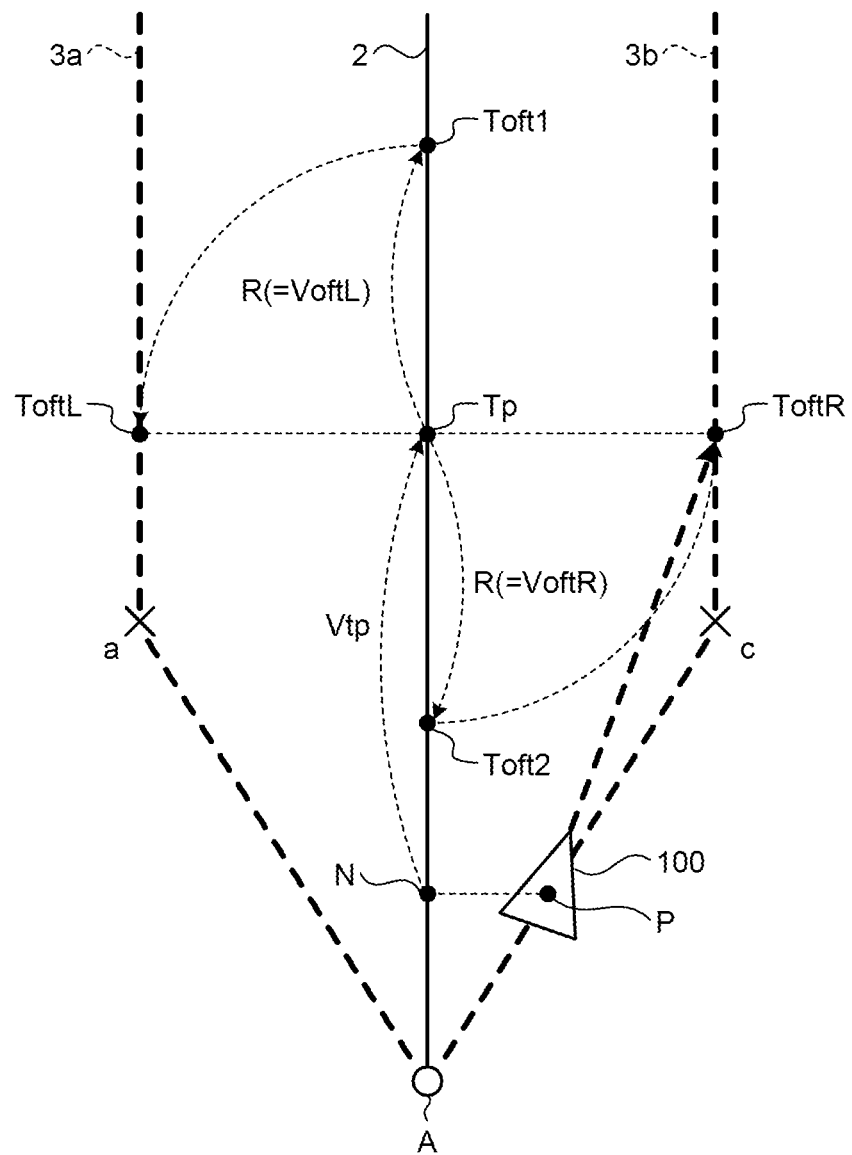
FIG. 18 is a conceptual diagram when the position P of the self-propelled device according to the first embodiment is ahead of the position illustrated in FIG. 17.
Figure 19:
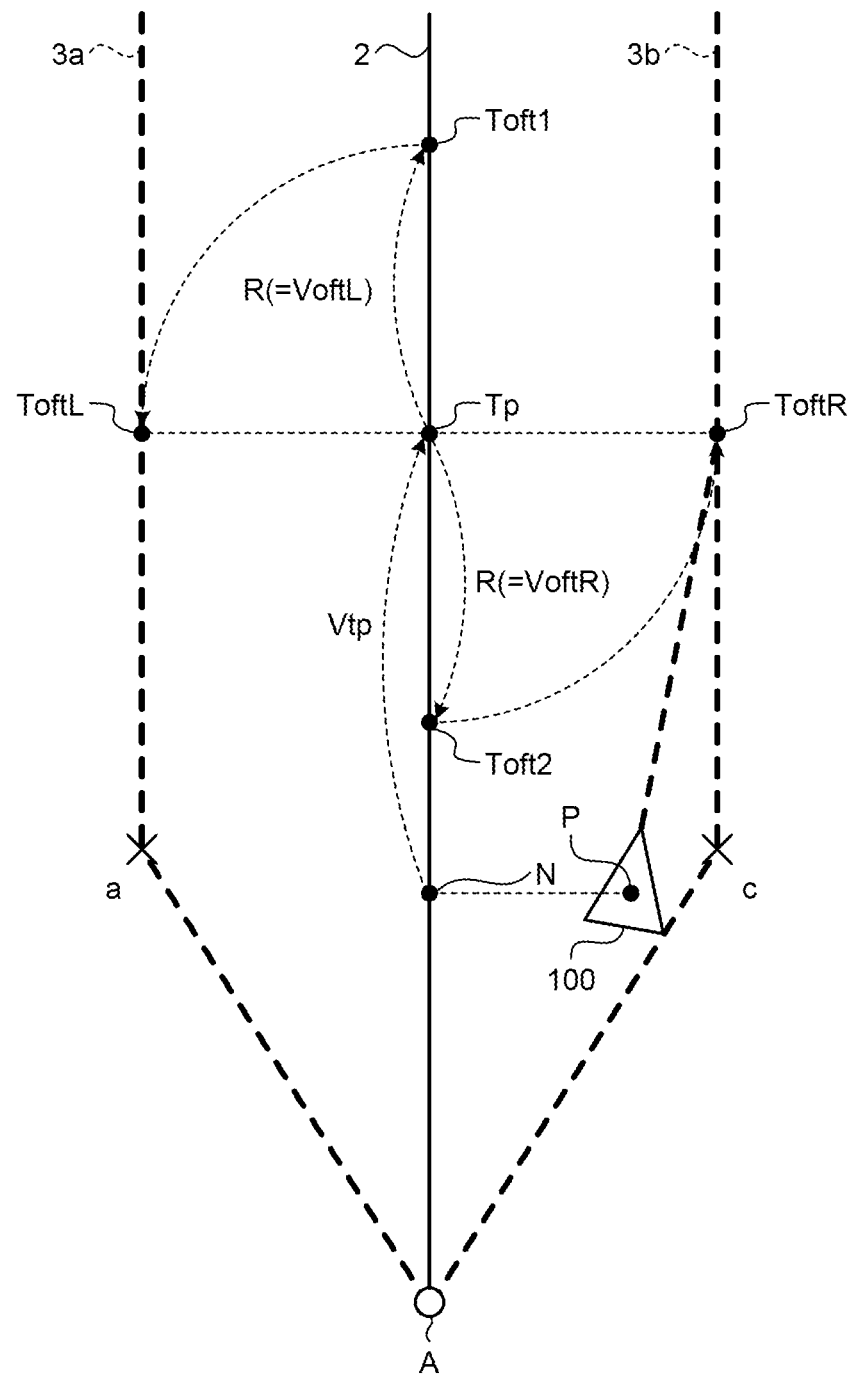
FIG. 19 is a conceptual diagram when the position P of the self-propelled device according to the first embodiment is further ahead of the position illustrated in FIG. 18.
Figure 20:
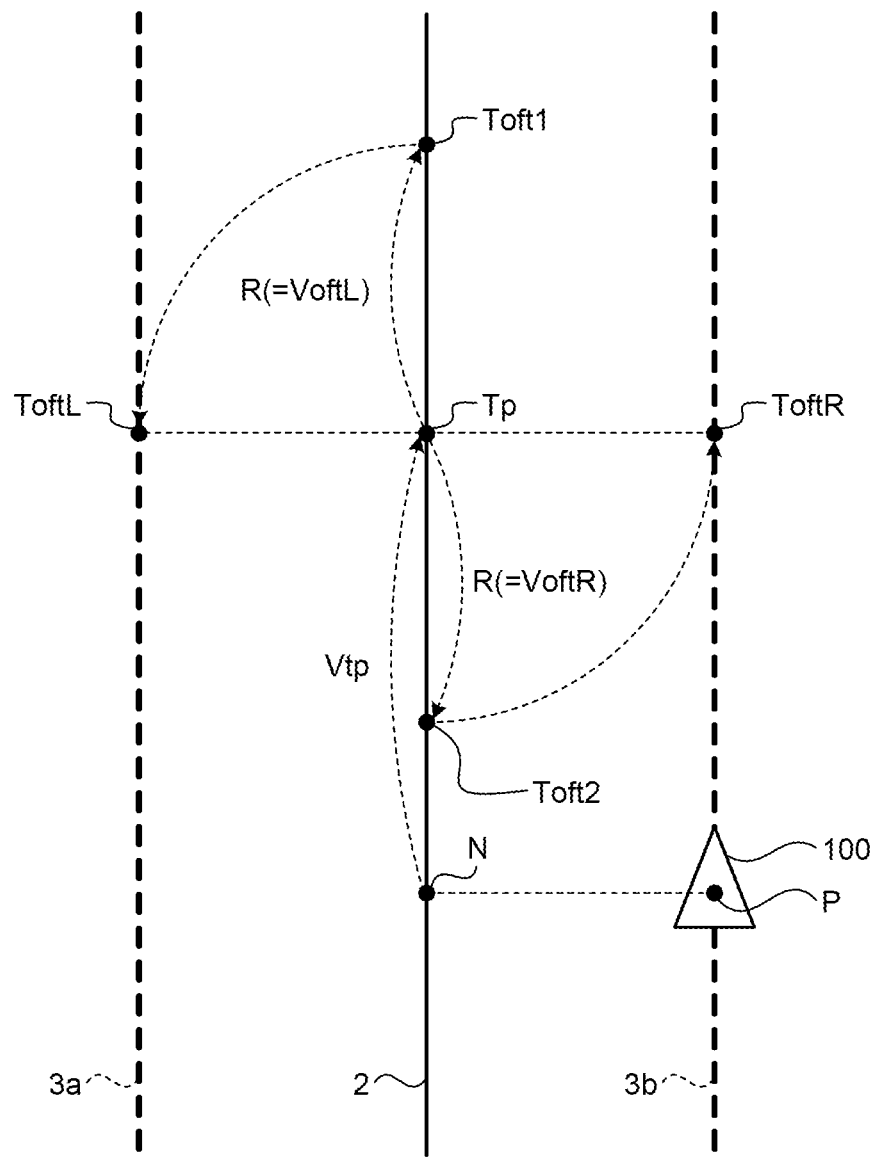
FIG. 20 is a conceptual diagram when the self-propelled device according to the first embodiment is in a predetermined zone of a straight region from Position c to Position d illustrated in FIG. 2.

FIG. 17 is a conceptual diagram when the position P of the self-propelled device according to the first embodiment coincides with the start point A. FIG. 18 is a conceptual diagram when the position P of the self-propelled device according to the first embodiment is ahead of the position illustrated in FIG. 17. FIG. 19 is a conceptual diagram when the position P of the self-propelled device according to the first embodiment is further ahead of the position illustrated in FIG. 18. FIG. 20 is a conceptual diagram when the self-propelled device according to the first embodiment is in a predetermined zone of a straight region from Position c to Position d illustrated in FIG. 2.

As illustrated in FIG. 17, when the position P of the self-propelled device 100 coincides with the start point A, the right target point ToftR coincides with Position c. In other words, the distance on the virtual path 2 from the start point A to the intersection point of the virtual path 2 and a straight line passing through Position c and which is orthogonal to the virtual path 2 is equal to the initial value Vtp (refer to FIG. 2). As illustrated in FIGS. 18 and 19, the right target point ToftR moves on a straight line connecting Position c and Position d as the position P of the self-propelled device 100 separates from the start point A, and accordingly, the position P of the self-propelled device 100 converges to the locus 3b of the target point, and as illustrated in FIG. 20, the position P of the self-propelled device 100 is on the locus 3b of the target point in a straight region from Position c to Position d.

Figure 21:
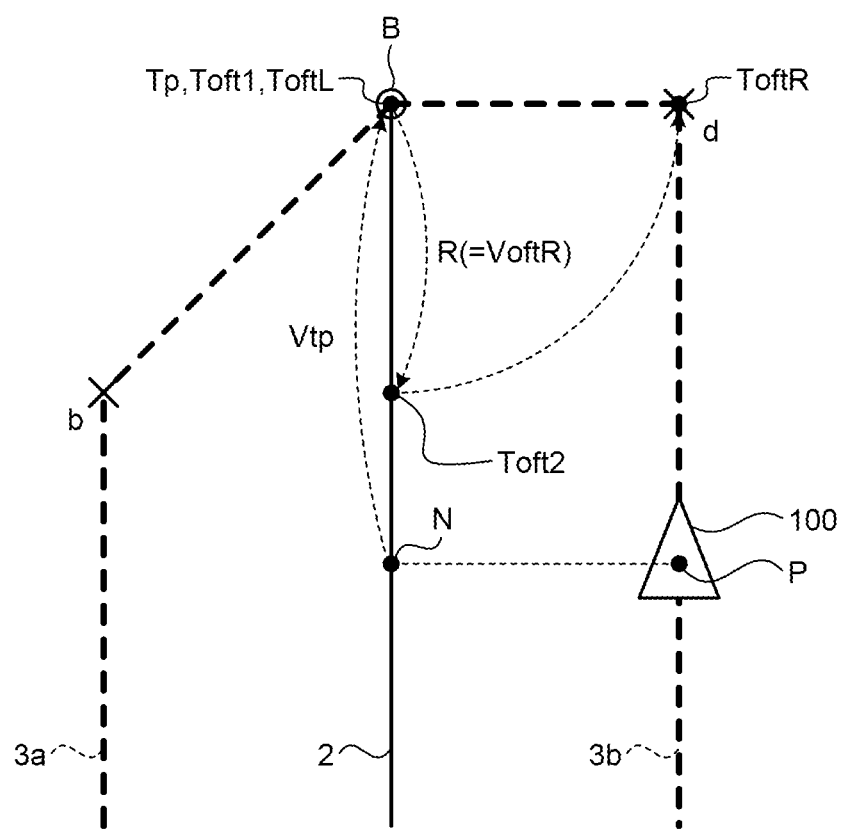
FIG. 21 is a conceptual diagram when the offset reference point Tp of the self-propelled device according to the first embodiment coincides with the goal point B.
Figure 22:
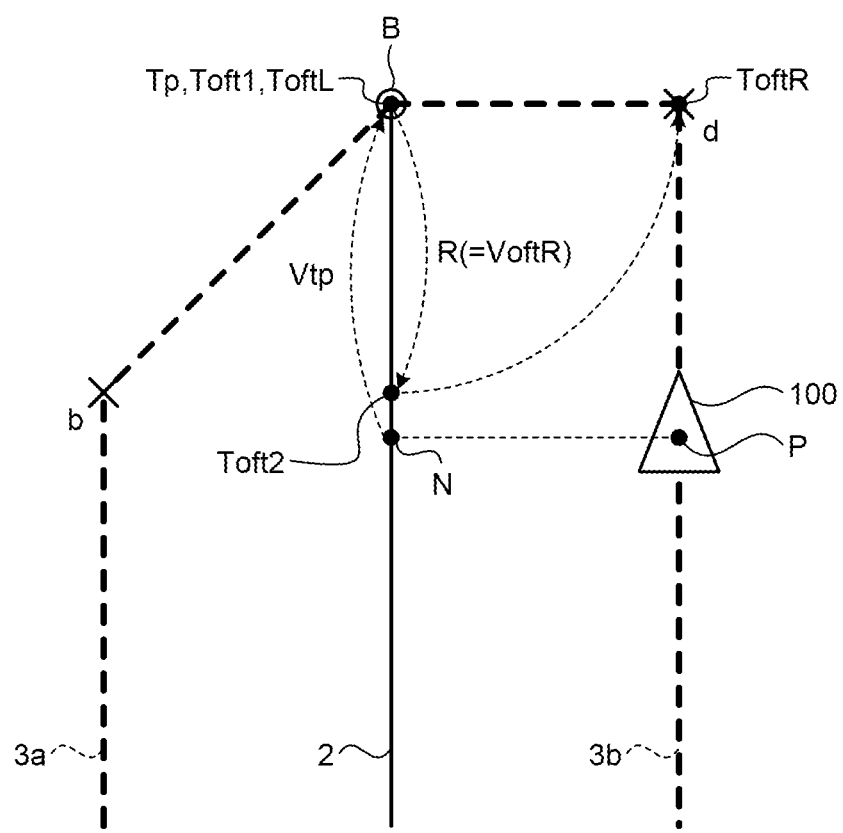
FIG. 22 is a conceptual diagram when the position P of the self-propelled device according to the first embodiment is ahead of the position illustrated in FIG. 21.
Figure 23:
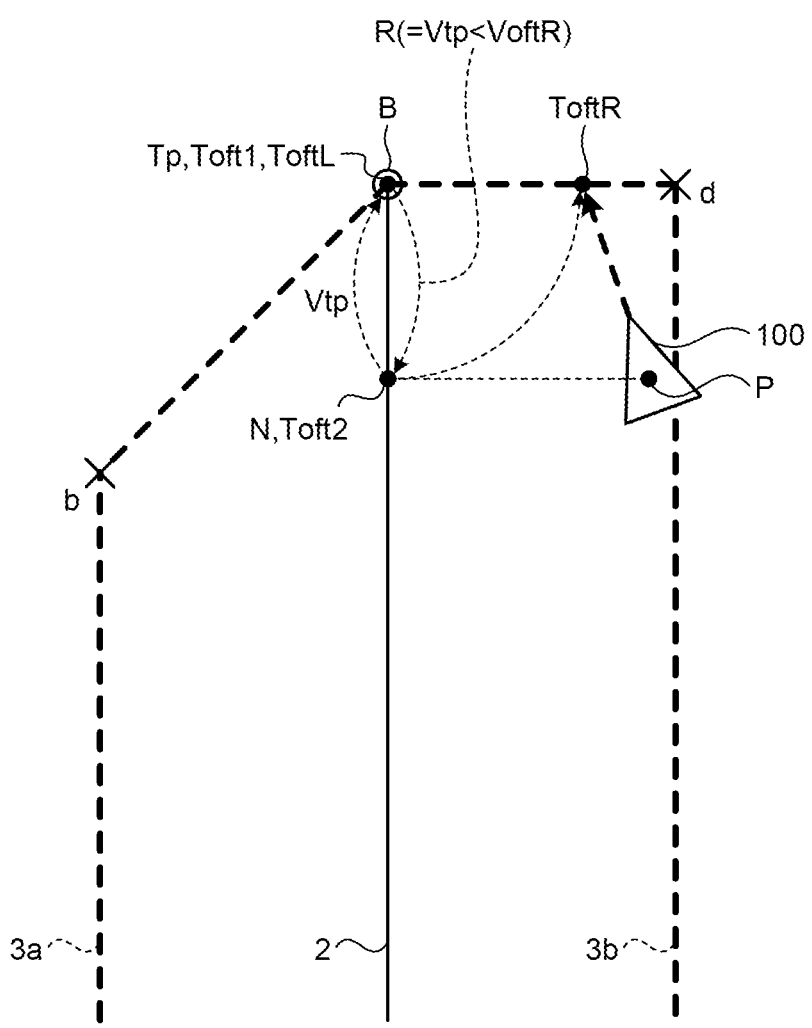
FIG. 23 is a conceptual diagram when a back-side offset point Toft2 of the self-propelled device according to the first embodiment coincides with the goal point B.
Figure 24:
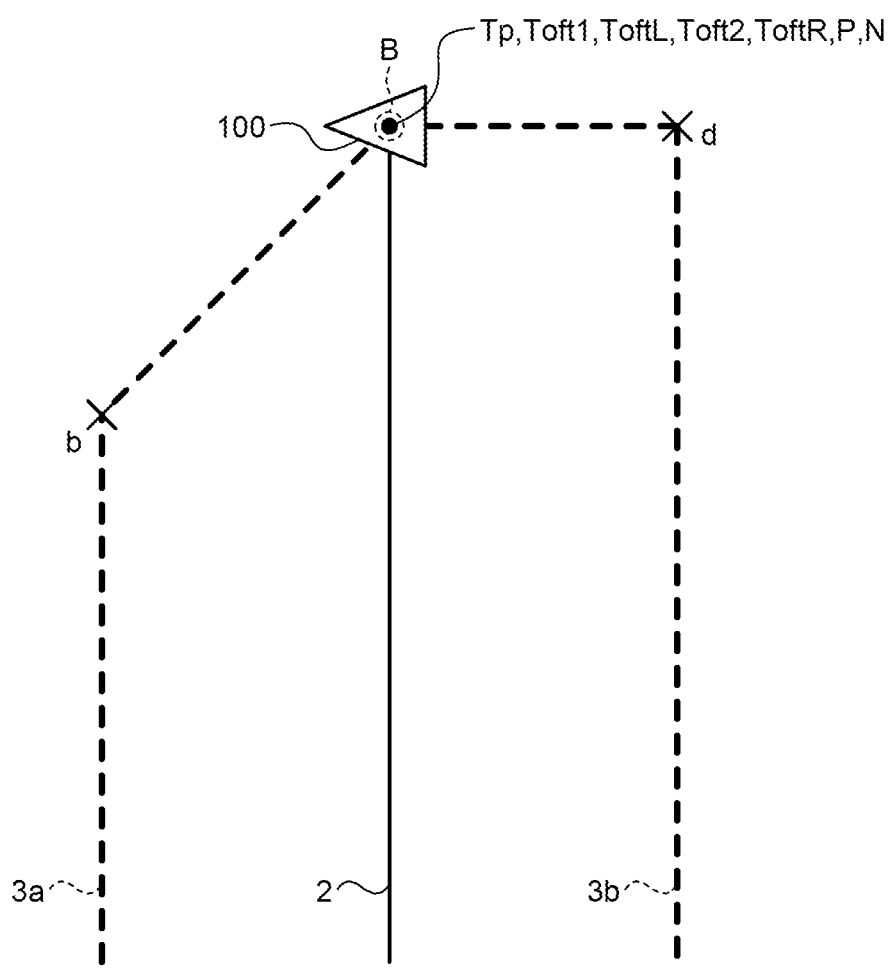
FIG. 24 is a conceptual diagram when the position P of the self-propelled device according to the first embodiment coincides with the goal point B.

FIG. 21 is a conceptual diagram when the offset reference point Tp of the self-propelled device according to the first embodiment coincides with the goal point B. FIG. 22 is a conceptual diagram when the position P of the self-propelled device according to the first embodiment is ahead of the position illustrated in FIG. 21. FIG. 23 is a conceptual diagram when the back-side offset point Toft2 of the self-propelled device according to the first embodiment coincides with the goal point B. FIG. 24 is a conceptual diagram when the position P of the self-propelled device according to the first embodiment coincides with the goal point B.

As illustrated in FIG. 21, when the offset reference point Tp of the self-propelled device 100 coincides with the goal point B, the right target point ToftR coincides with Position d. In other words, the intersection point of the virtual path 2 and a straight line passing through Position d and which is orthogonal to the virtual path 2 coincides with the goal point B (refer to FIG. 2).

The front-side offset point Toft1, the offset reference point Tp, and the back-side offset point Toft2 converge to the goal point B. In other words, as illustrated in FIG. 22, the right target point ToftR coincides with Position d when the offset reference point Tp has converged to the goal point B. Thereafter, as illustrated in FIG. 23, the back-side offset point Toft2 coincides with the intersection point N on the virtual path 2, and as indicated by Expression (2) described above, after the distance between the back-side offset point Toft2 and the goal point B becomes smaller than the second initial offset amount VoftR (R=Vtp<VoftR), the locus 3b of the right target point ToftR moves on a straight line connecting Position d and the goal point B. Thereafter, when the intersection point N (the back-side offset point Toft2) on the virtual path 2 coincides with the goal point B, the position P of the self-propelled device 100 coincides with the goal point B as illustrated in FIG. 24, and the self-propelled device 100 stops.

In this manner, the self-propelled device 100 according to the first embodiment can constantly travel the right side of the virtual path 2 from the start point A to the goal point B and reach the goal point B.

In the above-described example, the front-side offset point Toft1 and the left target point ToftL are determined, but no front-side offset point Toft1 nor the left target point ToftL may be determined when the self-propelled device 100 is set in advance to travel on the right side of the virtual path 2. In other words, the locus 3a of the left target point ToftL, which is illustrated in FIGS. 16 to 24, is not necessarily needed when traveling is set to be made on the right side of the virtual path 2.

As illustrated in FIG. 2, Position a and Position c are determined depending on the initial value Vtp. Thus, when the initial value Vtp is too large, the traveling path of the self-propelled device 100 cannot be effectively set on the left side (or on the right side) in some cases. Position b is determined depending on the first initial offset amount VoftL. In the present embodiment, when the initial value Vtp is smaller than the second initial offset amount VoftR, the right target point cannot be appropriately set near the start point A in some cases. Thus, the initial value Vtp is preferably equivalent to the first initial offset amount VoftL and the second initial offset amount VoftR.

As described above, the method of controlling traveling of the self-propelled device 100 according to the first embodiment includes: a first step of estimating the position of the self-propelled device 100; a second step of determining the intersection point N of the virtual path 2 connecting the start point A and the goal point B and the straight line passing through the position of the self-propelled device 100 and which is orthogonal to the virtual path 2; a third step of determining the offset reference point Tp between the intersection point N and the goal point B on the virtual path 2; a fourth step of determining at least an offset point (the front-side offset point Toft1 or the back-side offset point Toft2) at an offset on one of the goal point B side and the start point A side of the offset reference point Tp on the virtual path 2; a fifth step of determining a target point (the left target point ToftL or the right target point ToftR) reached by rotating the offset point (the front-side offset point Toft1 or the back-side offset point Toft2) by 90° about the offset reference point Tp in the anticlockwise direction; and a sixth step of causing the self-propelled device to travel toward the target point (the left target point ToftL or the right target point ToftR).

The self-propelled device 100 according to the first embodiment includes: the position estimation unit 102 configured to estimate the position of the self-propelled device 100; the travel unit 103 configured to move the self-propelled device 100; and the control unit 101 configured to determine the intersection point N of the virtual path 2 connecting the start point A and the goal point B and the straight line passing through the position of the self-propelled device 100 and which is orthogonal to the virtual path 2, determine the offset reference point Tp between the intersection point N and the goal point B on the virtual path 2, determine at least an offset point (the front-side offset point Toft1 or the back-side offset point Toft2) at an offset on one of the goal point B side and the start point A side of the offset reference point Tp on the virtual path 2, determine a target point (the left target point ToftL or the right target point ToftR) reached by rotating the offset point (the front-side offset point Toft1 or the back-side offset point Toft2) by 90° about the offset reference point Tp in the anticlockwise direction, and control the travel unit 103 so that the self-propelled device 100 travels toward the target point (the left target point ToftL or the right target point ToftR).

The computer program executed by a computer to control traveling of the self-propelled device 100 according to the first embodiment includes: a first step of estimating the position of the self-propelled device 100; a second step of determining the intersection point N of the virtual path 2 connecting the start point A and the goal point B and the straight line passing through the position of the self-propelled device 100 and which is orthogonal to the virtual path 2; a third step of determining the offset reference point Tp between the intersection point N and the goal point B on the virtual path 2; a fourth step of determining at least an offset point (the front-side offset point Toft1 or the back-side offset point Toft2) at an offset on one of the goal point B side and the start point A side of the offset reference point Tp on the virtual path 2; a fifth step of determining a target point (the left target point ToftL or the right target point ToftR) reached by rotating the offset point (the front-side offset point Toft1 or the back-side offset point Toft2) by 90° about the offset reference point Tp in the anticlockwise direction; and a sixth step of causing the self-propelled device to travel toward the target point (the left target point ToftL or the right target point ToftR).

The storage medium stores the travel control computer program executed by a computer and including: a first step of estimating the position of the self-propelled device 100; a second step of determining the intersection point N of the virtual path 2 connecting the start point A and the goal point B and the straight line passing through the position of the self-propelled device 100 and which is orthogonal to the virtual path 2; a third step of determining the offset reference point Tp between the intersection point N and the goal point B on the virtual path 2; a fourth step of determining at least an offset point (the front-side offset point Toft1 or the back-side offset point Toft2) at an offset on one of the goal point B side and the start point A side of the offset reference point Tp on the virtual path 2; a fifth step of determining a target point (the left target point ToftL or the right target point ToftR) reached by rotating the offset point (the front-side offset point Toft1 or the back-side offset point Toft2) by 90° about the offset reference point Tp in the anticlockwise direction; and a sixth step of causing the self-propelled device to travel toward the target point (the left target point ToftL or the right target point ToftR).

With these configurations, the self-propelled device 100 is capable of autonomously traveling on a traveling path at an offset on the left or on the right of one the virtual path 2 without providing, for example, an outgoing path and a returning path between two points.

Moreover, there is no need to generate a plurality of paths, which results in reduction of a load due to path generation.

Second Embodiment

Figure 25:
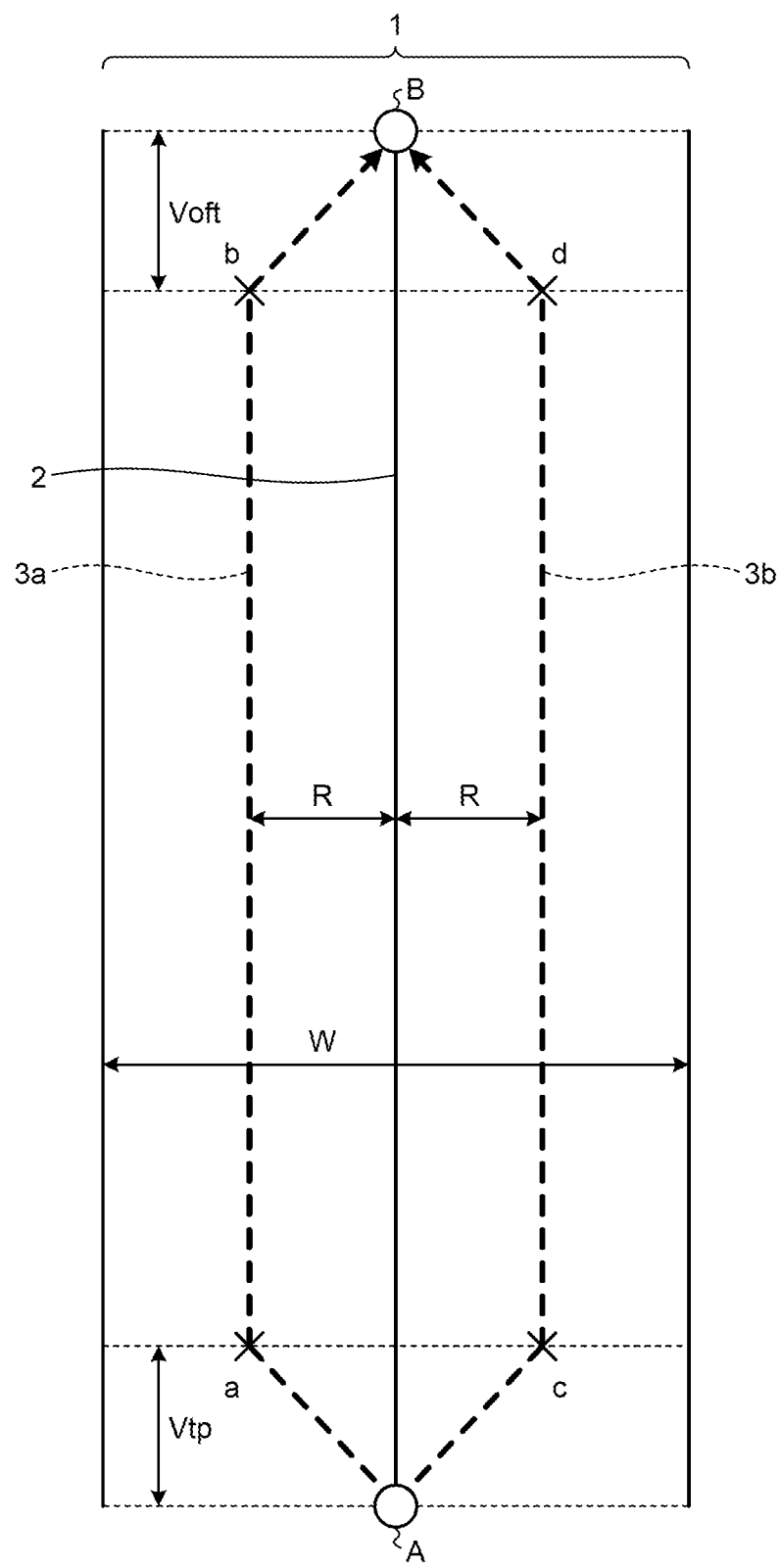
FIG. 25 is a schematic diagram of a region including a virtual path of the self-propelled device according to a second embodiment.

FIG. 25 is a schematic diagram of a region including the virtual path of the self-propelled device according to a second embodiment. Any component same as that in the configuration described above in the first embodiment is denoted by an identical reference sign, and duplicate description thereof is omitted.

The storage unit 105 stores the virtual path 2 generated by the path generation unit 104 (illustrated in FIG. 25). FIG. 25 illustrates an example in which the start point A and the goal point B are set at central parts of both ends of the corridor 1, respectively, and the straight line connecting the start point A and the goal point B is generated as the virtual path 2 of the self-propelled device 100. In FIG. 25, a solid line indicates the virtual path 2 of the self-propelled device 100, and dashed lines illustrate exemplary loci 3a and 3b of target points of the self-propelled device 100. Although FIG. 25 illustrates the example in which, for simplification of the following description, the virtual path 2 of the self-propelled device 100 is set to be the straight line connecting the start point A and the goal point B, the virtual path 2 of the self-propelled device 100 is not limited thereto, and for example, the virtual path 2 of the self-propelled device 100 may be bent in accordance with the corridor 1 when the corridor 1 is bent, or the virtual path 2 may be curved in accordance with the corridor 1 when the corridor 1 is curved.

In the example illustrated in FIG. 25, the self-propelled device 100 according to the second embodiment travels toward a target point at an offset by the offset amount R on the left or on the right of the virtual path 2 generated by the path generation unit 104.

Figure 26:
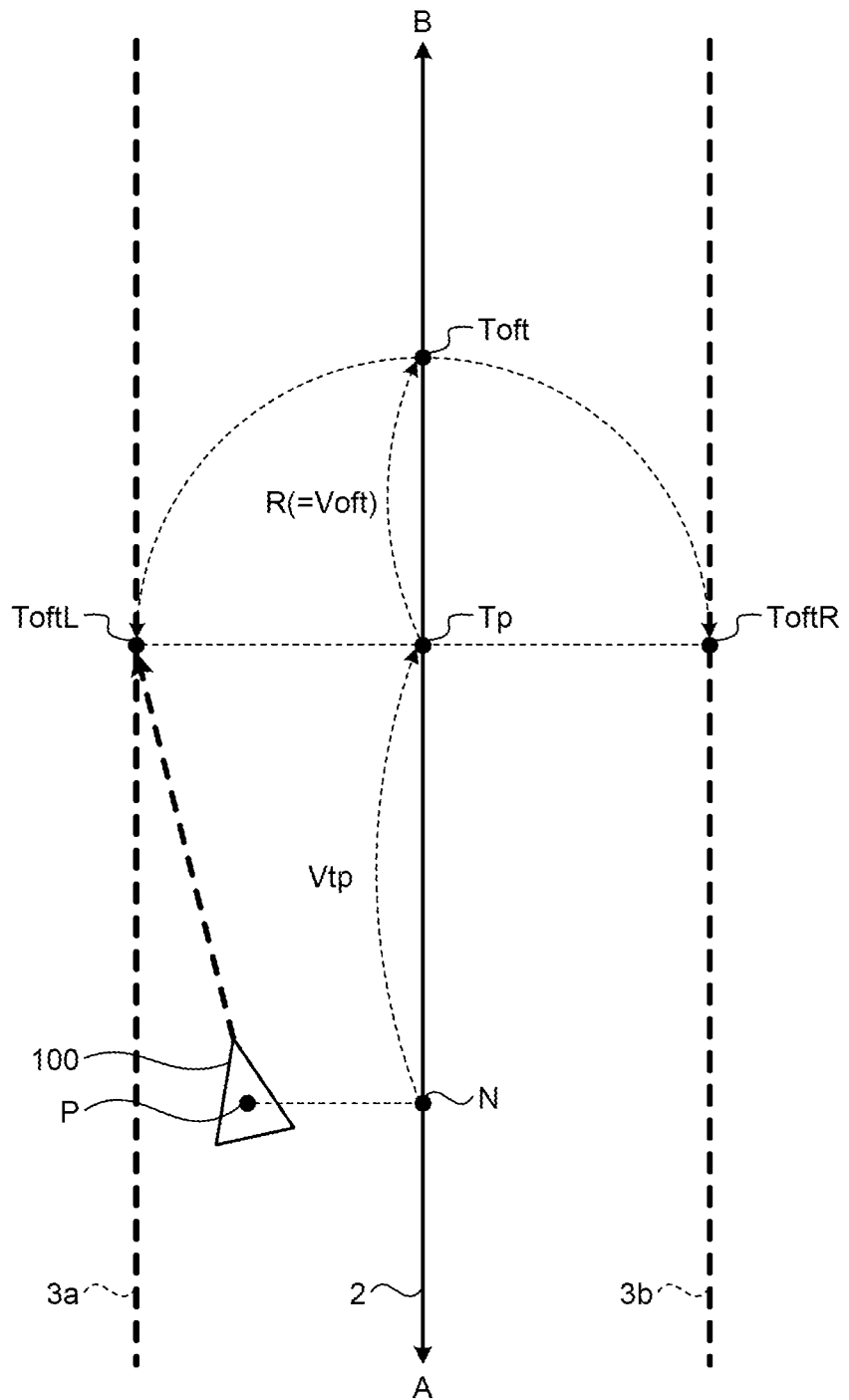
FIG. 26 is a conceptual diagram for describing the method of controlling traveling of the self-propelled device according to the second embodiment.
Figure 27:
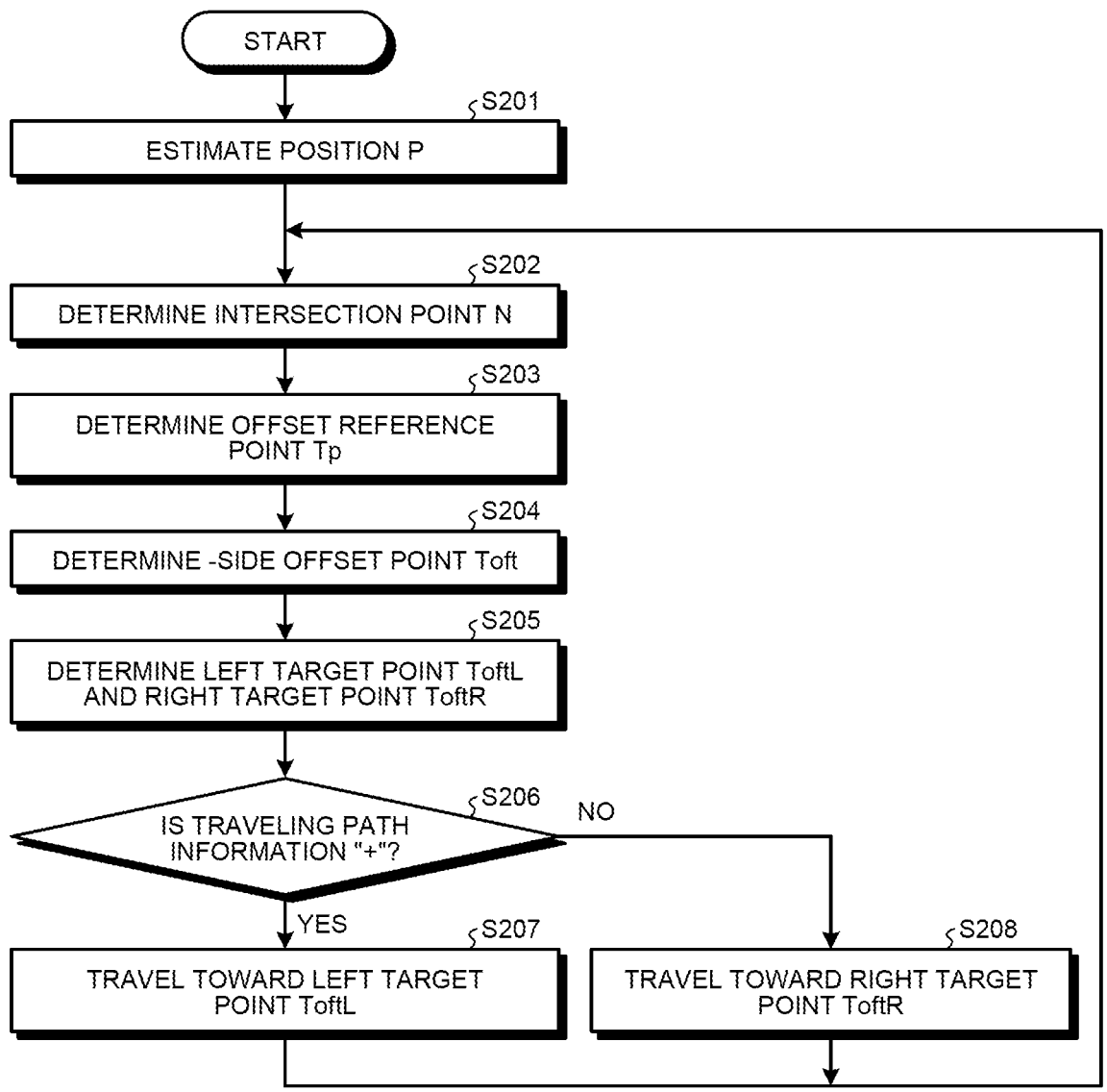
FIG. 27 is a flowchart illustrating exemplary travel control processing at the self-propelled device according to the second embodiment.

The following describes a basic exemplary operation when the loci 3a and 3b of the target points illustrated in FIG. 25 are target traveling paths of the self-propelled device 100 according to the second embodiment. FIG. 26 is a conceptual diagram for describing the method of controlling traveling of the self-propelled device according to the second embodiment. FIG. 27 is a flowchart illustrating exemplary travel control processing at the self-propelled device according to the second embodiment. FIG. 28 is a diagram illustrating various kinds of exemplary information stored in the storage unit.

FIG. 26 illustrates an example in which the self-propelled device 100 is on the left side of the virtual path 2. FIG. 28 illustrates an example in which, in addition to the virtual path 2 described above, the storage unit 105 stores, as the various kinds of information D1 necessary for control of the self-propelled device 100, the position information of the start point A, the position information of the goal point B, the traveling path information, the initial value Vtp of the distance from the intersection point N to the offset reference point, and an initial offset amount Voft.

For example, the position information of the start point A and the goal point B stored in the storage unit 105 is input from the operation unit 11 and stored as coordinate information in a region including the virtual path 2.

In the present embodiment, as in the example illustrated in FIG. 28, the traveling path information stored in the storage unit 105 is set to be "+ (plus, positive)" when traveling is made on the left side of the virtual path 2 or "− (minus, negative)" when traveling is made on the right side of the virtual path 2.

The storage unit 105 also stores the initial value Vtp of the distance between the intersection point N of the virtual path 2 and the straight line passing through the position of the self-propelled device 100 and which is orthogonal to the virtual path 2 and the offset reference point Tp provided before the goal point B. The initial value Vtp is assumed to be, for example, 2 m approximately. In the present embodiment, for example, the initial value Vtp is input through the transmission-reception unit 13 and the input-output unit 106 in advance and stored in the storage unit 105 as a discrete value such as numerical data or digital data by the control unit 101. Alternatively, for example, the initial value Vtp may be changed in accordance with the speed of the self-propelled device 100 by the control unit 101. In this case, the speed information of the self-propelled device 100 may be included in the various kinds of information D1 stored in the storage unit 105. The present embodiment is not limited to this method of setting the initial value Vtp.

The storage unit 105 also stores the initial offset amount Voft as the initial value of the offset amount R to the loci 3a and 3b of the target points when traveling is made on the left side and right side of the virtual path 2.

In the present embodiment, for example, the initial offset amount Voft is input through the transmission-reception unit 13 and the input-output unit 106 in advance and stored in the storage unit 105 as a discrete value such as numerical data or digital data by the control unit 101. Alternatively, for example, the path generation unit 104 may set the initial offset amount Voft based on the map information stored in the storage unit 105. In this case, for example, the setting may be performed in accordance with various conditions including the width of the corridor 1. Alternatively, the setting may be performed while taking into account clearance when a plurality of self-propelled devices 100 pass by at the corridor 1. More specifically, the initial offset amount Voft can take, for example, the maximum value of W/2 when W represents the width of the corridor 1, but preferably takes a value smaller than W/2, for example, W/4 when the width W of the corridor 1 is restricted by a wall surface. Moreover, each initial offset amount may be, for example, W/8 or 3W/8 when a plurality of self-propelled devices 100 travel side by side on the left side or the right side of the virtual path 2. The present embodiment is not limited to this method of setting the initial offset amount Voft.

In the present embodiment, the initial value Vtp of the distance from the intersection point N to the offset reference point Tp on the virtual path 2, the initial offset amount Voft, and the offset amount R satisfy condition expression (4) below.

$$Vtp \geq Voft \geq R \qquad (4)$$

In the present embodiment, the travel control processing at the self-propelled device 100 according to the second embodiment is performed through execution of the travel control computer program stored in the storage unit 105.

First, the position estimation unit 102 estimates the position P of the self-propelled device 100 (step S201).

The control unit 101 determines the intersection point N of the virtual path 2 and the straight line passing through the position P of the self-propelled device 100 and which is orthogonal to the virtual path 2 (step S202).

Subsequently, the control unit 101 determines the offset reference point Tp separated by the initial value Vtp on the goal point B side from the intersection point N on the virtual path 2 (step S203).

Subsequently, the control unit 101 determines an offset point Toft at an offset by the offset amount R (in this example, the initial offset amount Voft) on the goal point B side from the offset reference point Tp on the virtual path 2 (step S204).

Subsequently, the control unit 101 determines the left target point ToftL reached by rotating the offset point Toft by 90° about the offset reference point Tp in the anticlockwise direction, and determines the right target point ToftR reached by rotating the offset point Toft by 90° about the offset reference point Tp in the clockwise direction (step S205).

Then, the control unit 101 determines whether the traveling path information is "+ (plus, positive)", in other words, whether traveling is set to be made on the left side of the virtual path 2 (step S206).

When the traveling path information is "+(plus, positive)" (Yes at step S206), the control unit 101 controls the rotation angle of the wheel 103a of the travel unit 103 so that traveling is made toward the left target point ToftL (step S207), and then returns to step S202.

When the traveling path information is "− (minus, negative)" (No at step S206), the control unit 101 controls the rotation angle of the wheel 103a of the travel unit 103 so that traveling is made toward the right target point ToftR (step S208), and then returns to step S202.

The following describes, with reference to FIGS. 29 to 39, an example in which the self-propelled device 100 autonomously travels on the left side of the virtual path 2, in other words, autonomously travels on a target traveling path set to the locus 3a of the target point illustrated in FIG. 25.

Figure 29:
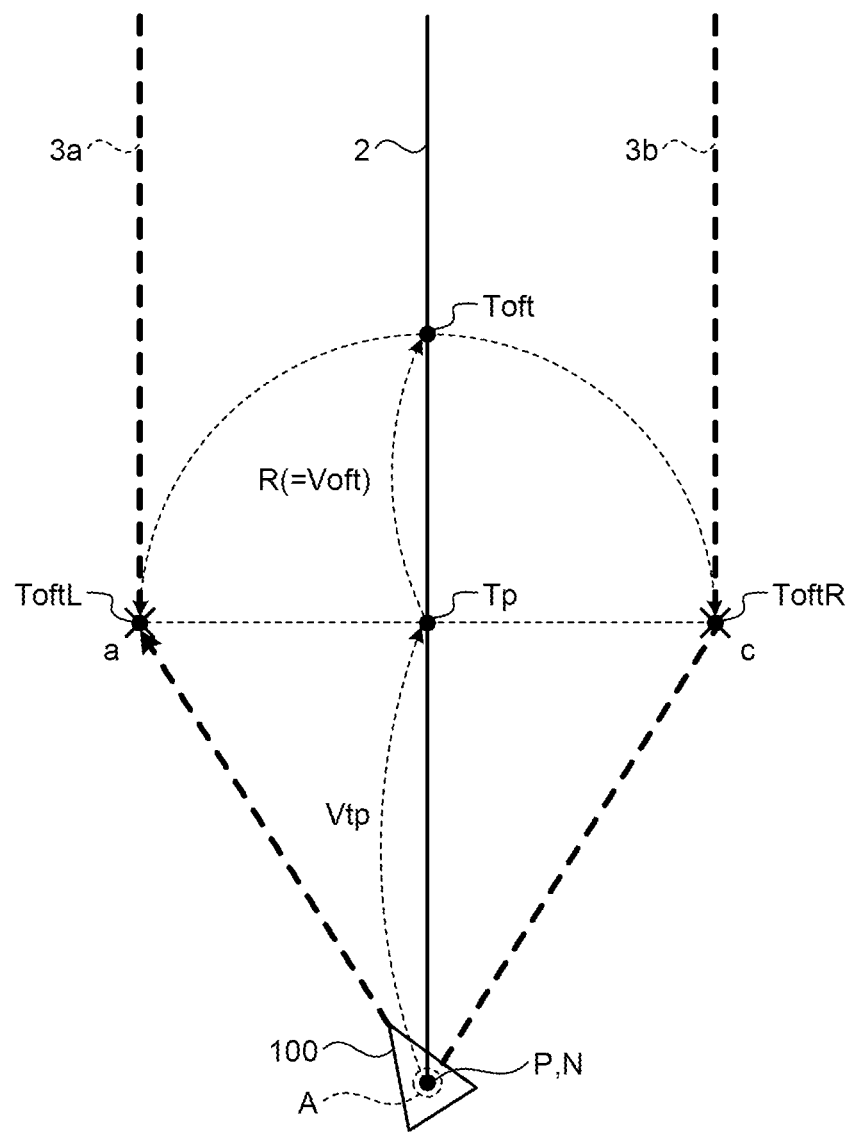
FIG. 29 is a conceptual diagram when the position P of the self-propelled device according to the second embodiment coincides with the start point A.
Figure 30:
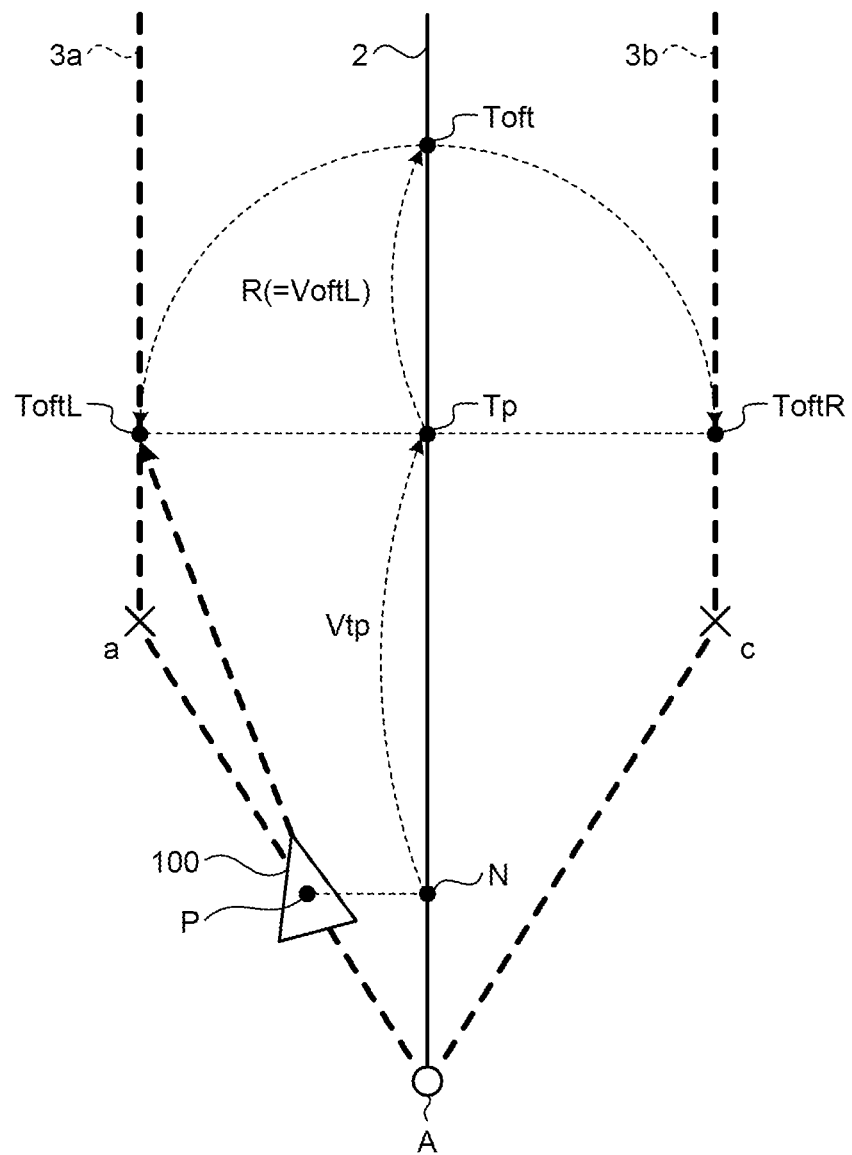
FIG. 30 is a conceptual diagram when the position P of the self-propelled device according to the second embodiment is ahead of the position illustrated in FIG. 29.
Figure 31:
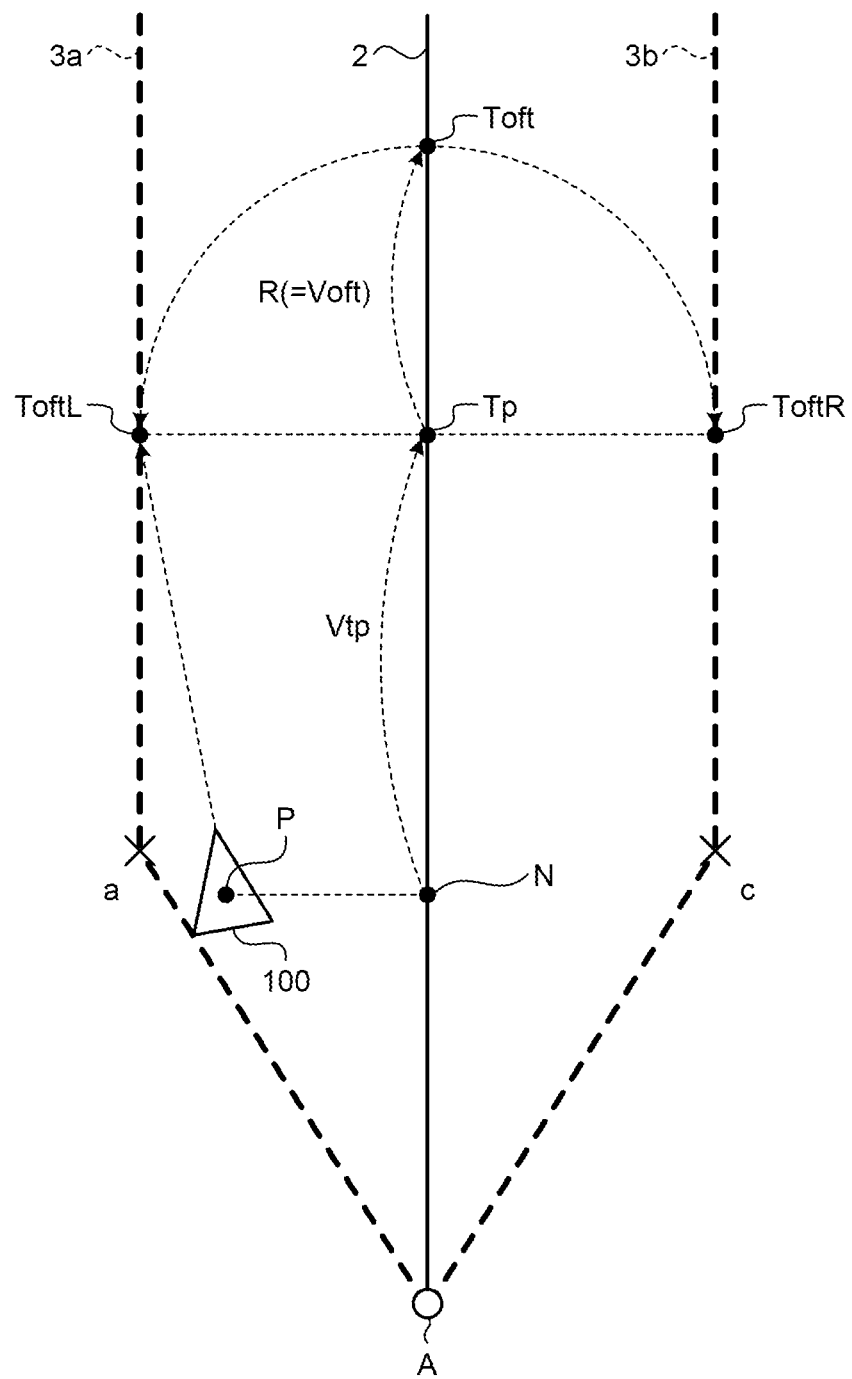
FIG. 31 is a conceptual diagram when the position P of the self-propelled device according to the second embodiment is further ahead of the position illustrated in FIG. 30.
Figure 32:
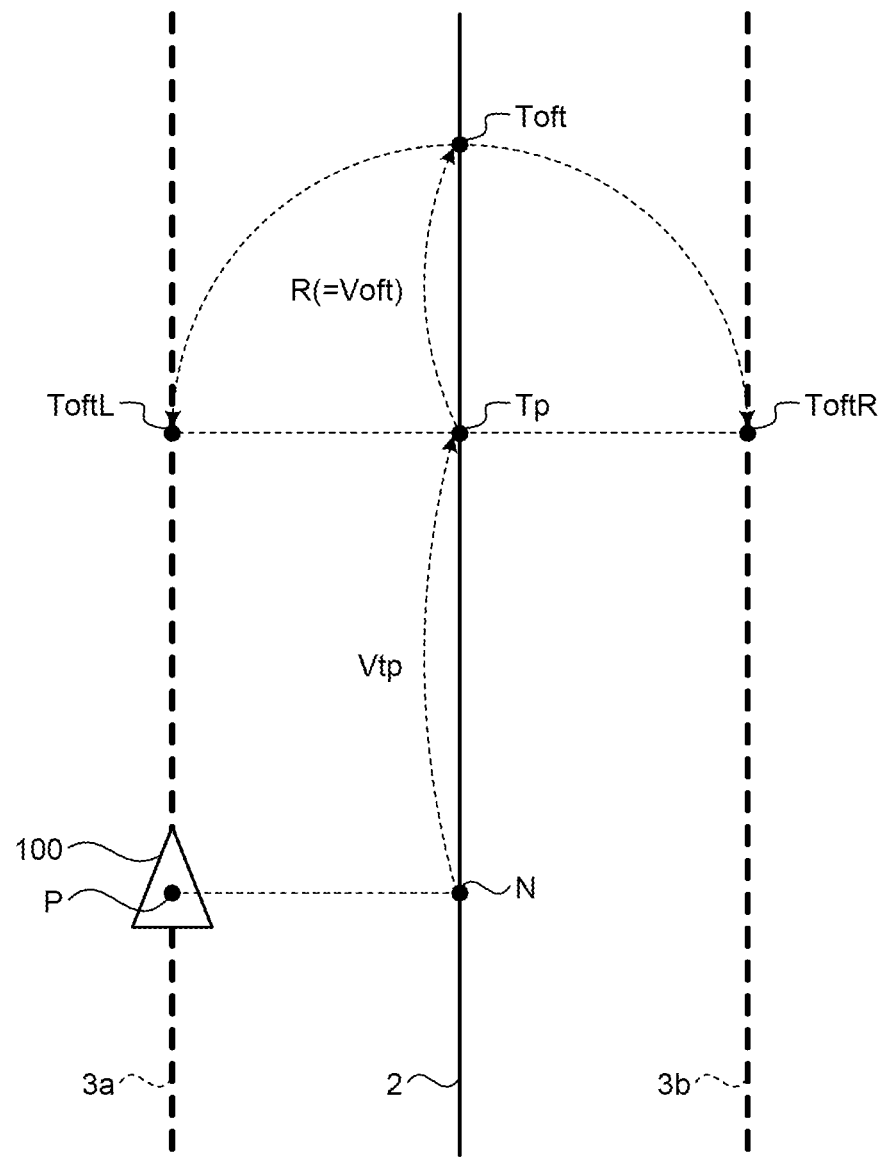
FIG. 32 is a conceptual diagram when the self-propelled device according to the second embodiment is in a predetermined zone of a straight region from Position a to Position b illustrated in FIG. 25.

FIG. 29 is a conceptual diagram when the position P of the self-propelled device according to the second embodiment coincides with the start point A. FIG. 30 is a conceptual diagram when the position P of the self-propelled device according to the second embodiment is ahead of the position illustrated in FIG. 29. FIG. 31 is a conceptual diagram when the position P of the self-propelled device according to the second embodiment is further ahead of the position illustrated in FIG. 30. FIG. 32 is a conceptual diagram when the self-propelled device according to the second embodiment is in a predetermined zone of the straight region from Position a to Position b illustrated in FIG. 25.

As illustrated in FIG. 29, when the position P of the self-propelled device 100 coincides with the start point A, the left target point ToftL coincides with Position a. In other words, the distance on the virtual path 2 from the start point A to the intersection point of the virtual path 2 and the straight line passing through Position a and which is orthogonal to the virtual path 2 is equal to the initial value Vtp (refer to FIG. 25). As illustrated in FIGS. 30 and 31, the left target point ToftL moves on the straight line connecting Position a and Position b as the position P of the self-propelled device 100 separates from the start point A, and accordingly, the position P of the self-propelled device 100 converges to the locus 3a of the target point, and as illustrated in FIG. 32, the position P of the self-propelled device 100 is on the locus 3a of the target point in the straight region from Position a to Position b.

Figure 33:
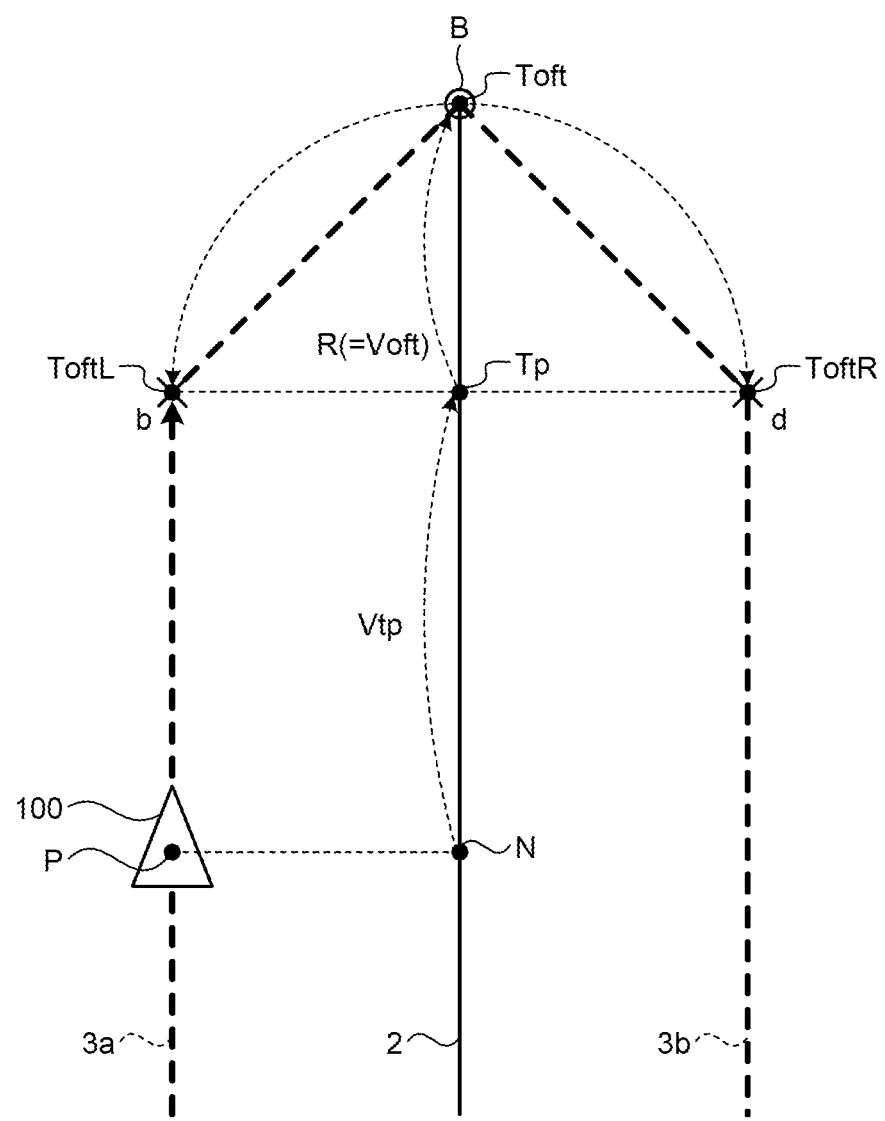
FIG. 33 is a conceptual diagram when an offset point Toft of the self-propelled device according to the second embodiment coincides with the goal point B.
Figure 34:
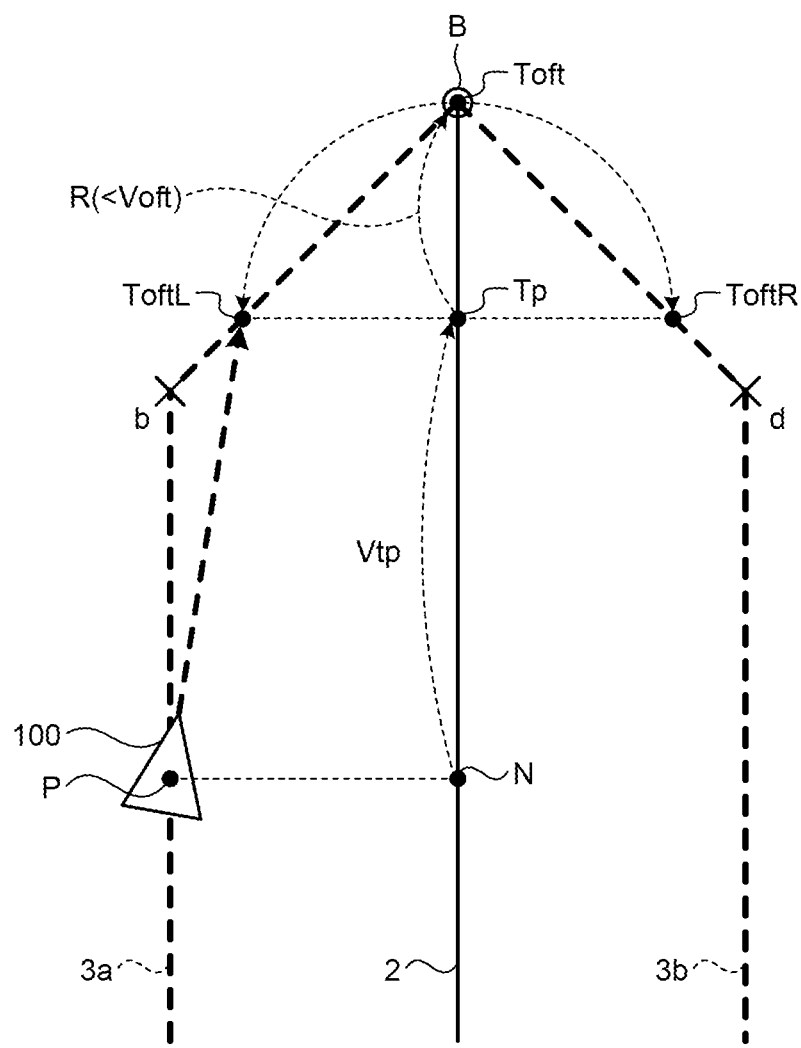
FIG. 34 is a conceptual diagram when the position P of the self-propelled device according to the second embodiment is ahead of the position illustrated in FIG. 33.
Figure 35:
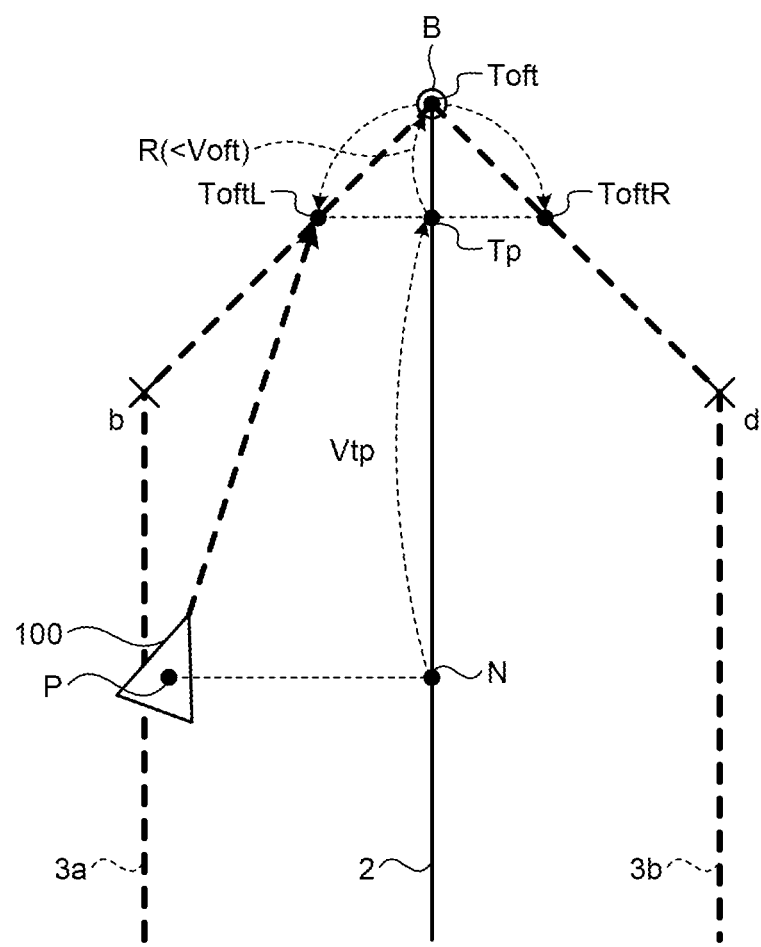
FIG. 35 is a conceptual diagram when the position P of the self-propelled device according to the second embodiment is further ahead of the position illustrated in FIG. 34.
Figure 36:
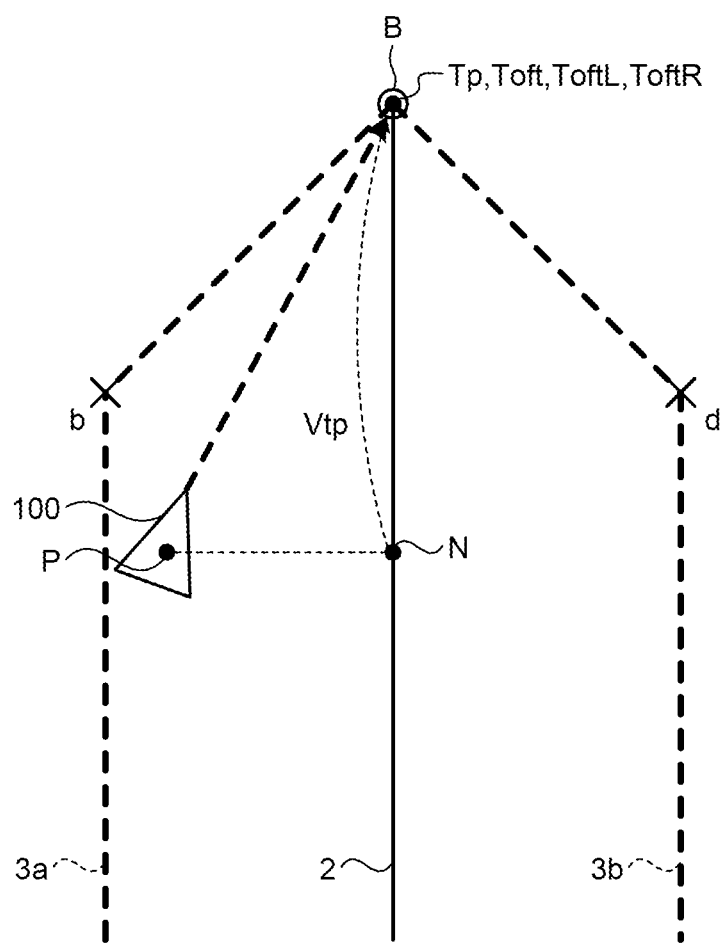
FIG. 36 is a conceptual diagram when the offset reference point Tp of the self-propelled device according to the second embodiment coincides with the goal point B.
Figure 37:
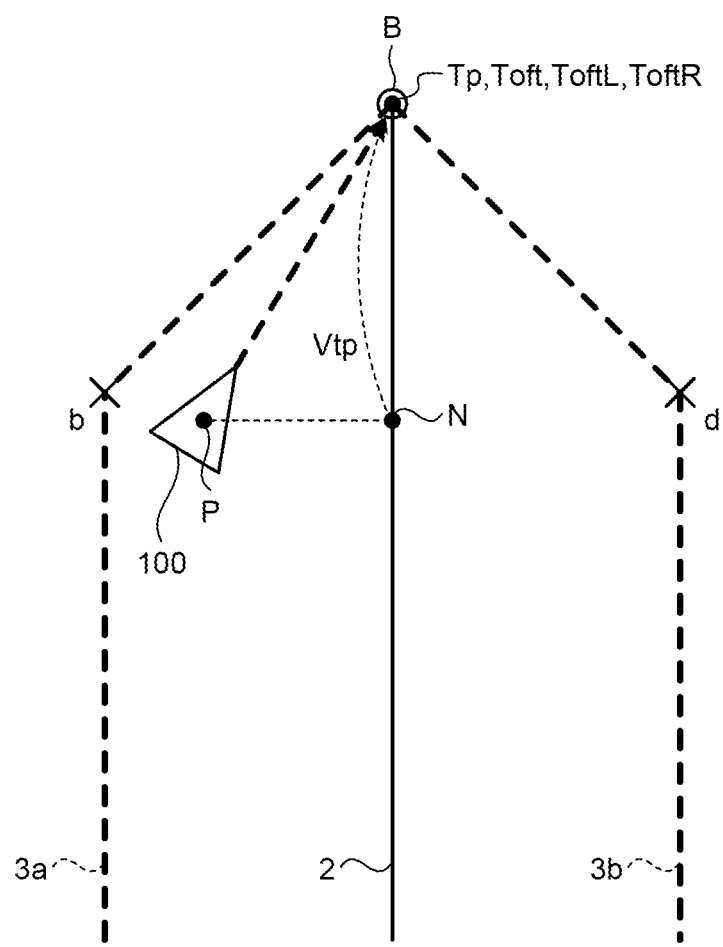
FIG. 37 is a conceptual diagram when the position P of the self-propelled device according to the second embodiment is ahead of the position illustrated in FIG. 36.
Figure 38:
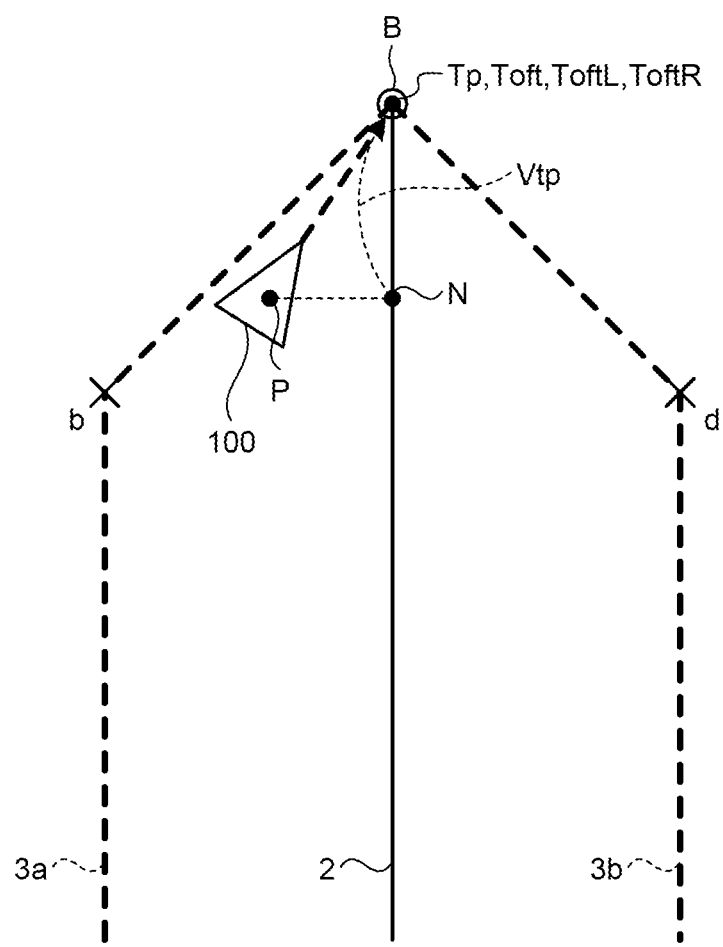
FIG. 38 is a conceptual diagram when the position P of the self-propelled device according to the second embodiment is further ahead of the position illustrated in FIG. 37.
Figure 39:
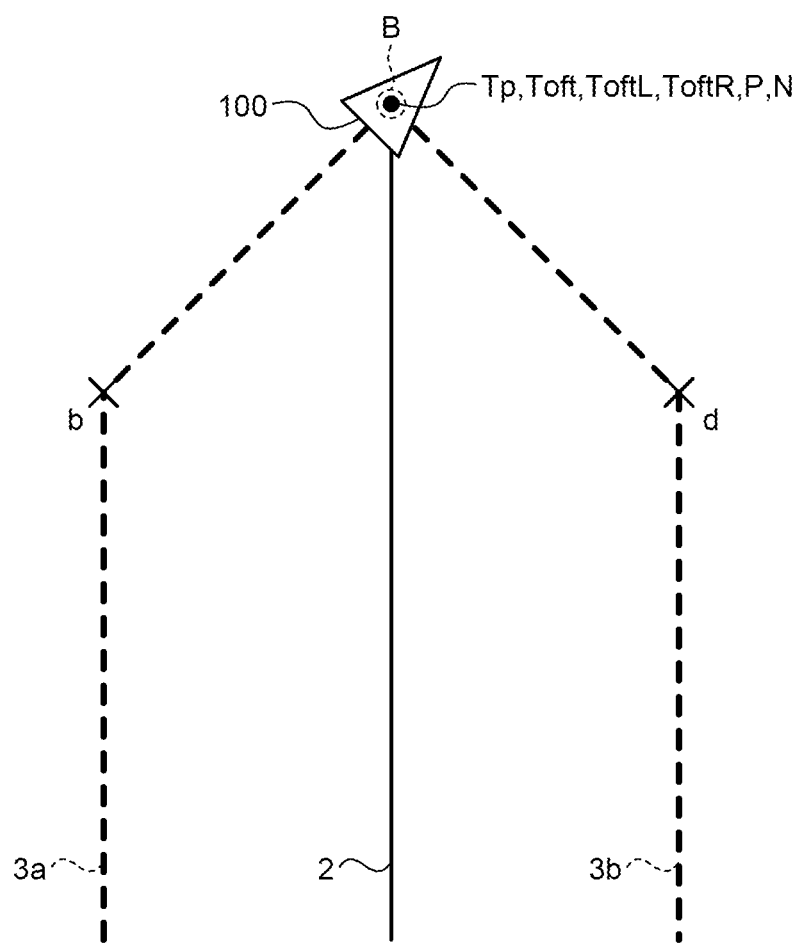
FIG. 39 is a conceptual diagram when the position P of the self-propelled device according to the second embodiment coincides with the goal point B.

FIG. 33 is a conceptual diagram when the offset point Toft of the self-propelled device according to the second embodiment coincides with the goal point B. FIG. 34 is a conceptual diagram when the position P of the self-propelled device according to the second embodiment is ahead of the position illustrated in FIG. 33. FIG. 35 is a conceptual diagram when the position P of the self-propelled device according to the second embodiment is further ahead of the position illustrated in FIG. 34. FIG. 36 is a conceptual diagram when the offset reference point Tp of the self-propelled device according to the second embodiment coincides with the goal point B. FIG. 37 is a conceptual diagram when the position P of the self-propelled device according to the second embodiment is ahead of the position illustrated in FIG. 36. FIG. 38 is a conceptual diagram when the position P of the self-propelled device according to the second embodiment is further ahead of the position illustrated in FIG. 37. FIG. 39 is a conceptual diagram when the position P of the self-propelled device according to the second embodiment coincides with the goal point B.

As illustrated in FIG. 33, when the offset point Toft of the self-propelled device 100 coincides with the goal point B, the left target point ToftL coincides with Position b. In other words, the distance on the virtual path 2 from the goal point B to the intersection point of the virtual path 2 and the straight line passing through Position b and which is orthogonal to the virtual path 2 is equal to the initial offset amount Voft (refer to FIG. 25).

The offset point Toft and the offset reference point Tp converge to the goal point B. In other words, as illustrated in FIGS. 34 and 35, Expression (4) described above indicates that, after the distance between the offset reference point Tp and the goal point B becomes smaller than the initial offset amount Voft (R<Voft), the locus 3a of the left target point ToftL moves on the straight line connecting Position b and the goal point B, and when the offset reference point Tp coincides with the goal point B, the left target point ToftL coincides with the goal point B as illustrated in FIG. 36. Thereafter, the position P of the self-propelled device 100 approaches the left target point ToftL at the goal point B as illustrated in FIGS. 37 and 38, the position P of the self-propelled device 100 coincides with the goal point B as illustrated in FIG. 39, and the self-propelled device 100 stops.

In this manner, the self-propelled device 100 according to the second embodiment can constantly travel on the left side of the virtual path 2 from the start point A to the goal point B and reach the goal point B.

In the above-described example, the right target point ToftR is determined, but no right target point ToftR may be determined when the self-propelled device 100 is set in advance to travel on the left side of the virtual path 2. In other words, the locus 3b of the right target point ToftR, which is illustrated in FIGS. 29 to 39, is not necessarily needed when traveling is set to be made on the left side of the virtual path 2.

The following describes, with reference to FIGS. 40 to 47, an example in which the self-propelled device 100 autonomously travels on the right side of the virtual path 2, in other words, autonomously travels on a target traveling path set to the locus 3b of the target point, which is illustrated in FIG. 25.

Figure 40:
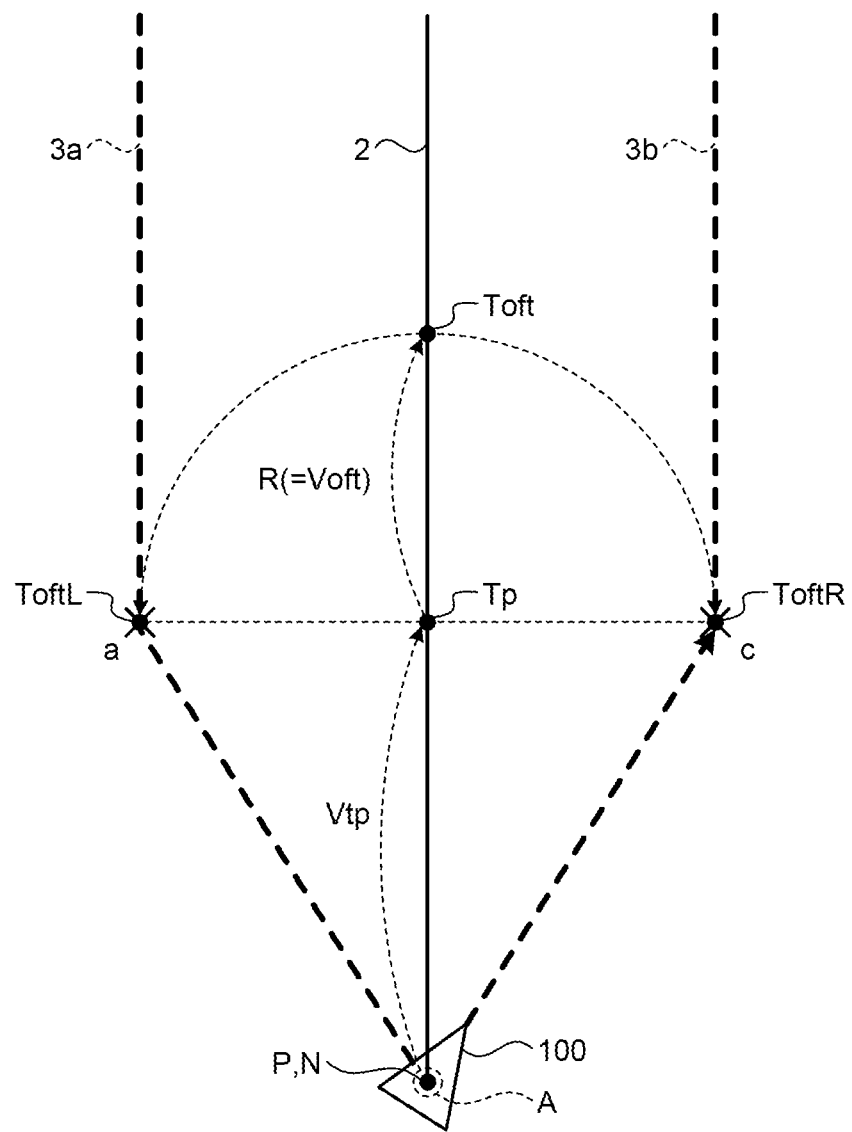
FIG. 40 is a conceptual diagram when the position P of the self-propelled device according to the second embodiment coincides with the start point A.
Figure 41:
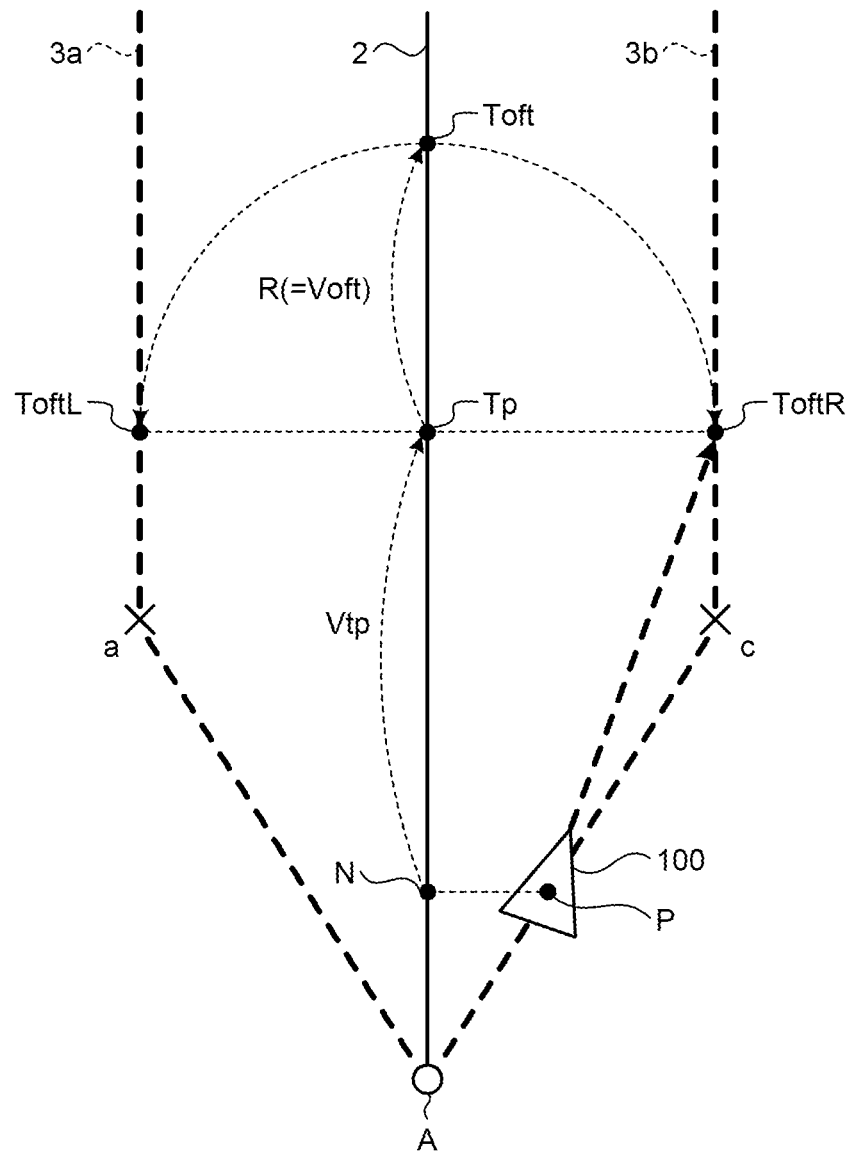
FIG. 41 is a conceptual diagram when the position P of the self-propelled device according to the second embodiment is ahead of the position illustrated in FIG. 40.
Figure 42:
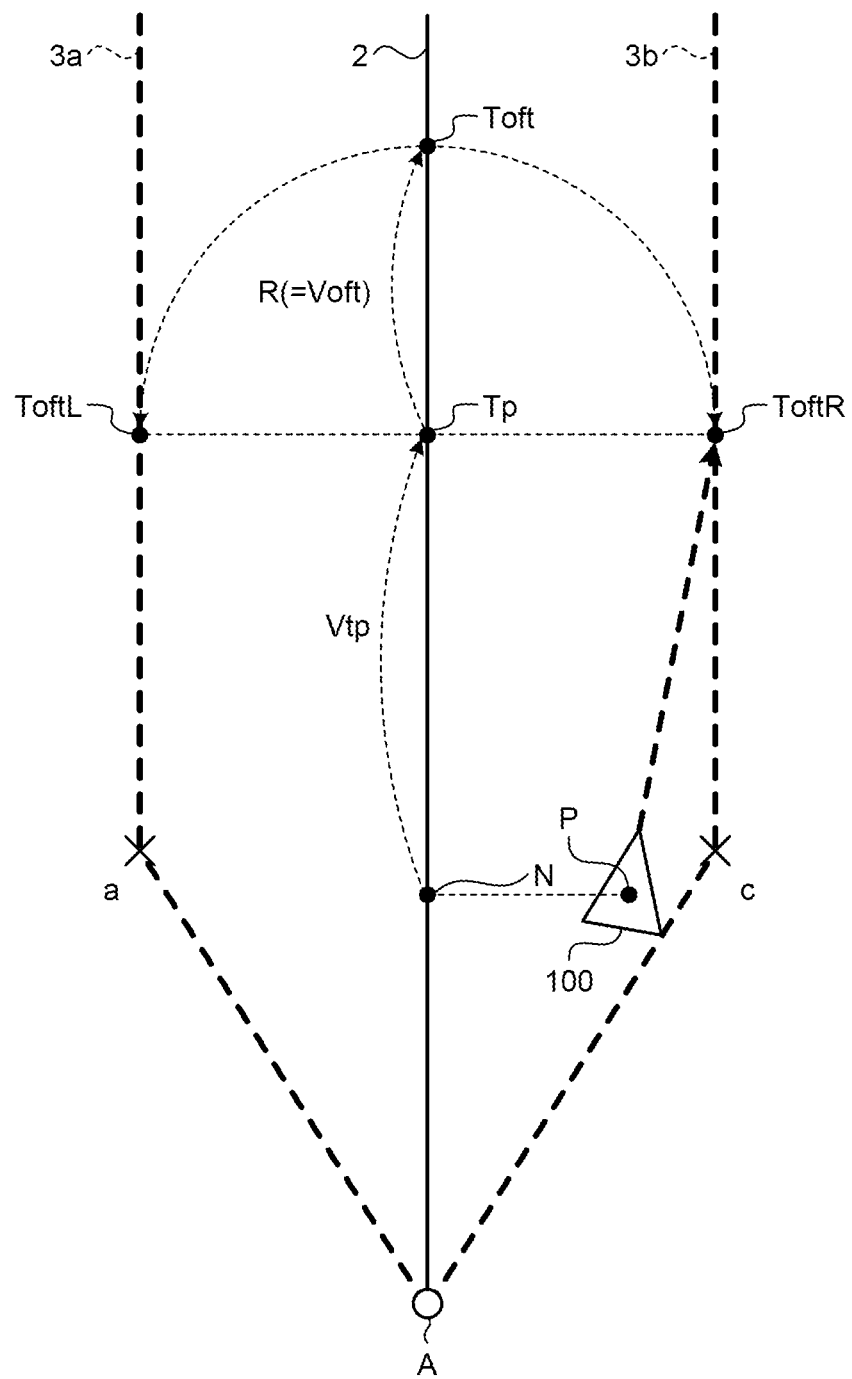
FIG. 42 is a conceptual diagram when the position P of the self-propelled device according to the second embodiment is further ahead of the position illustrated in FIG. 41.
Figure 43:
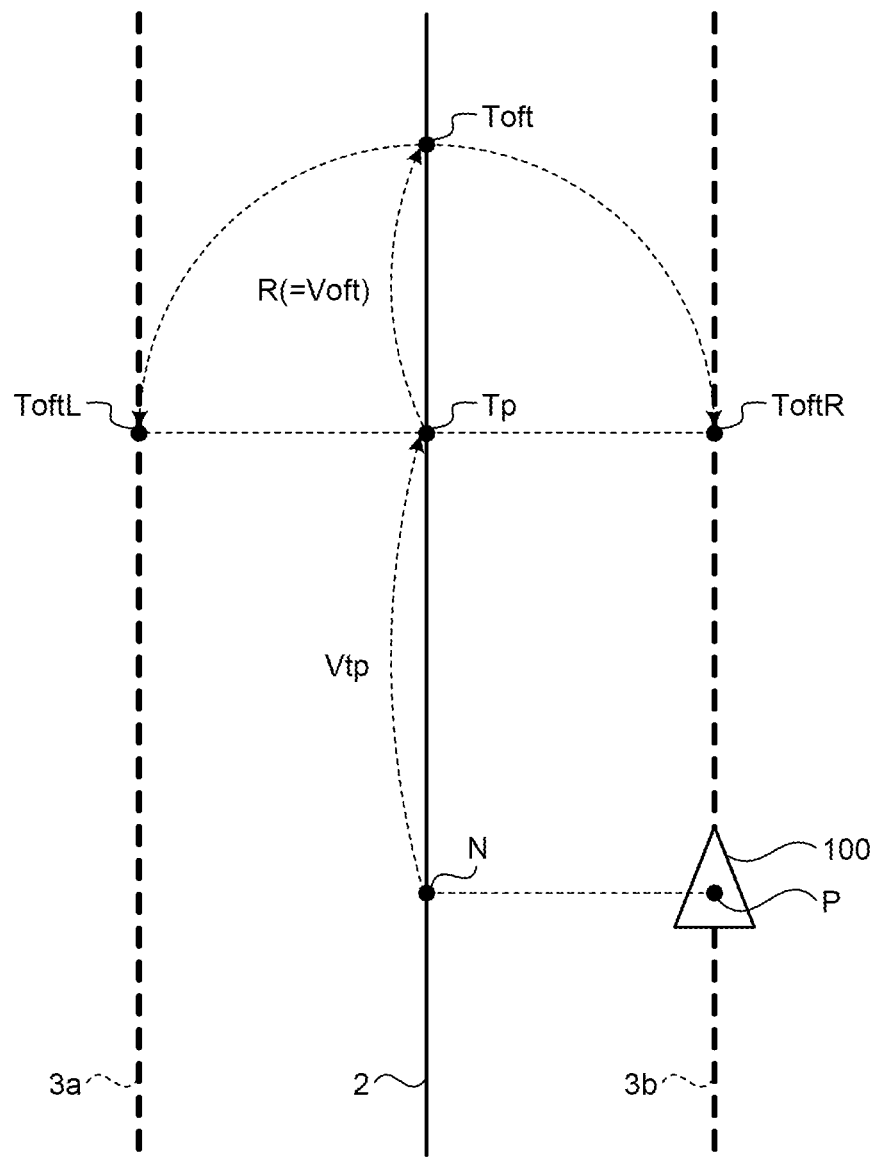
FIG. 43 is a conceptual diagram when the self-propelled device according to the second embodiment is in a predetermined zone of a straight region from Position c to Position d illustrated in FIG. 25.

FIG. 40 is a conceptual diagram when the position P of the self-propelled device according to the second embodiment coincides with the start point A. FIG. 41 is a conceptual diagram when the position P of the self-propelled device according to the second embodiment is ahead of the position illustrated in FIG. 40. FIG. 42 is a conceptual diagram when the position P of the self-propelled device according to the second embodiment is further ahead of the position illustrated in FIG. 41. FIG. 43 is a conceptual diagram when the self-propelled device according to the second embodiment is in a predetermined zone of the straight region from Position c to Position d illustrated in FIG. 25.

As illustrated in FIG. 40, when the position P of the self-propelled device 100 coincides with the start point A, the right target point ToftR coincides with Position c. In other words, the distance on the virtual path 2 from the start point A to the intersection point of the virtual path 2 and the straight line passing through Position c and which is orthogonal to the virtual path 2 is equal to the initial value Vtp (refer to FIG. 25). As illustrated in FIGS. 41 and 42, the right target point ToftR moves on the straight line connecting Position c and Position d as the position P of the self-propelled device 100 separates from the start point A, and accordingly, the position P of the self-propelled device 100 converges to the locus 3b of the target point, and as illustrated in FIG. 43, the position P of the self-propelled device 100 is on the locus 3b of the target point in the straight region from Position c to Position d.

Figure 44:
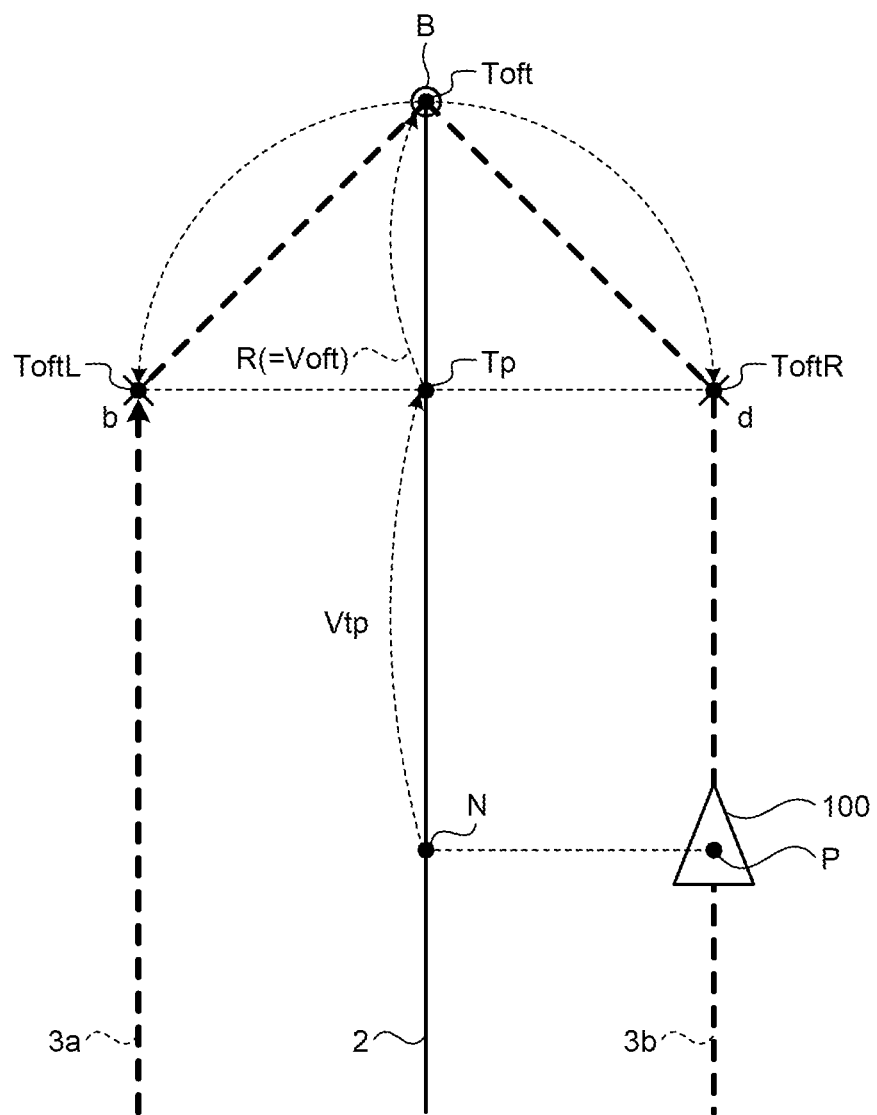
FIG. 44 is a conceptual diagram when the offset point Toft of the self-propelled device according to the second embodiment coincides with the goal point B.
Figure 45:
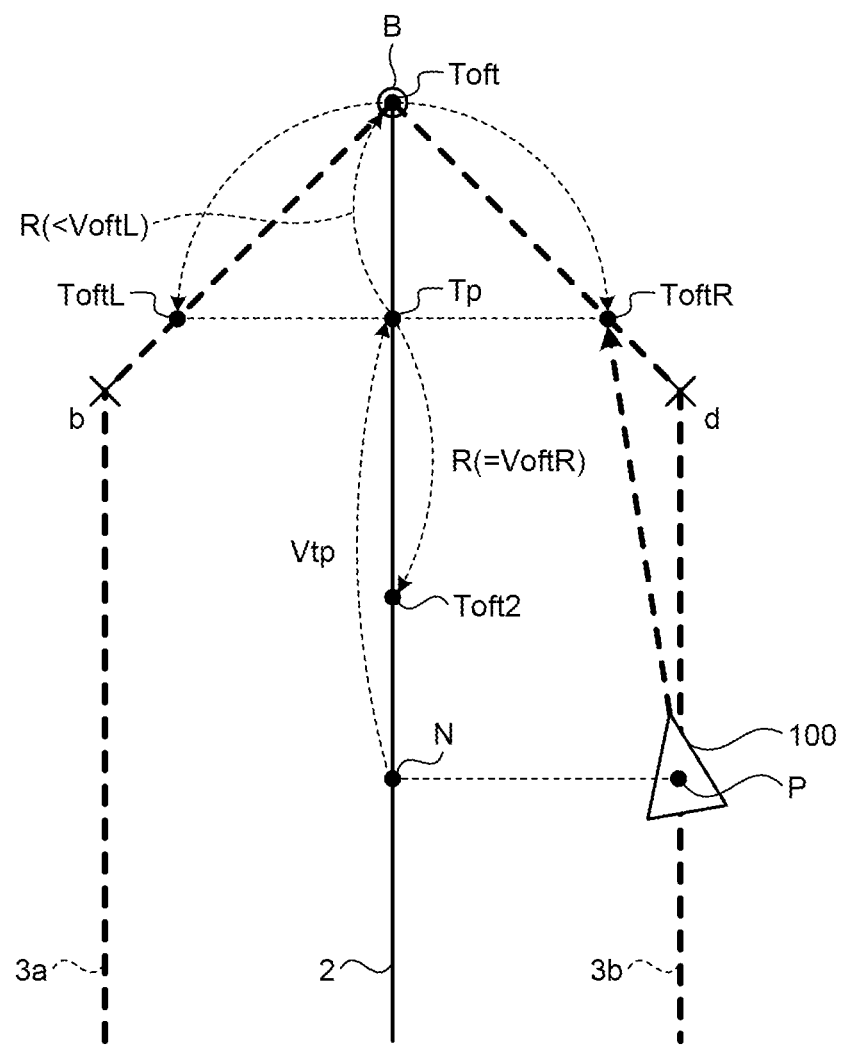
FIG. 45 is a conceptual diagram when the position P of the self-propelled device according to the second embodiment is ahead of the position illustrated in FIG. 44.
Figure 46:
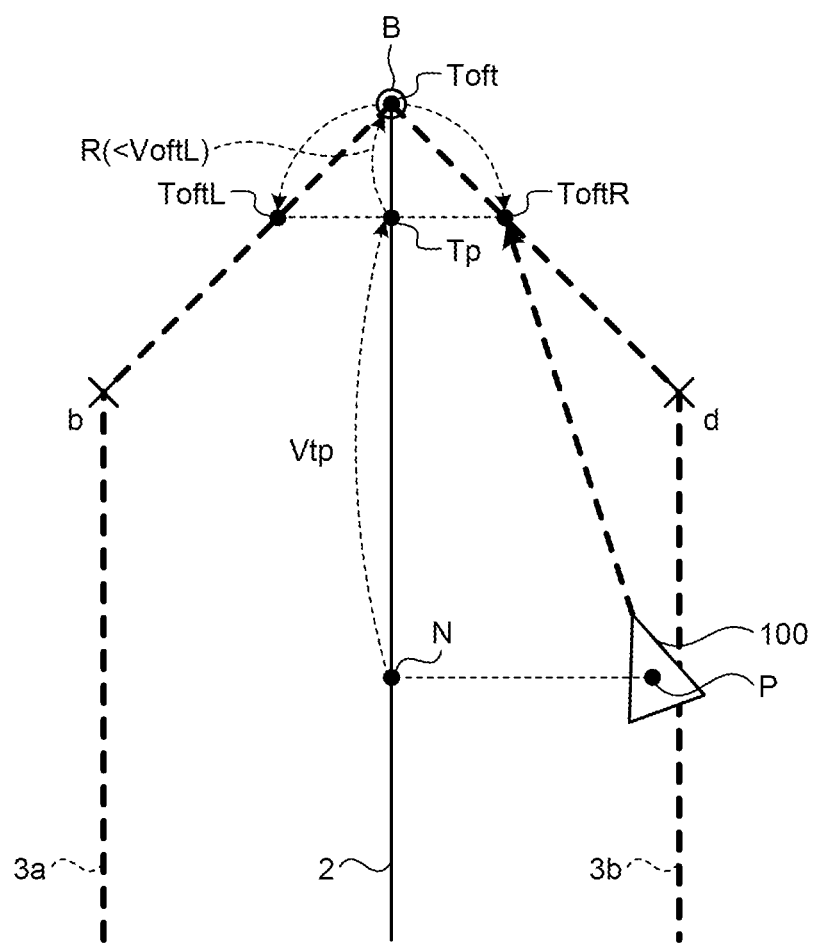
FIG. 46 is a conceptual diagram when the position P of the self-propelled device according to the second embodiment is further ahead of the position illustrated in FIG. 45.
Figure 47:
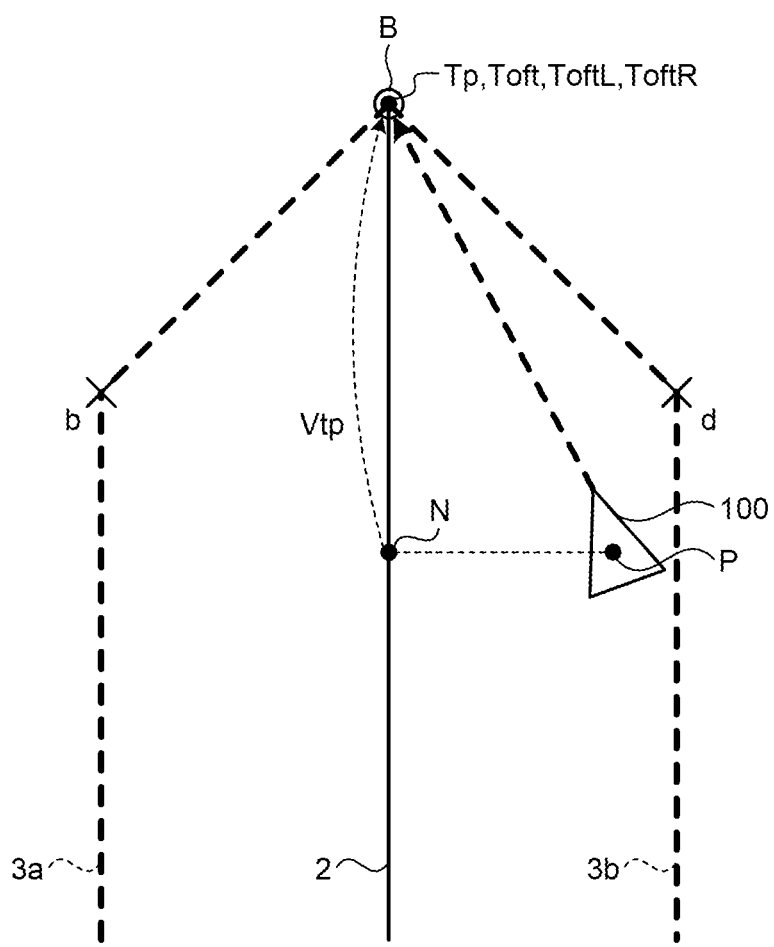
FIG. 47 is a conceptual diagram when the offset reference point Tp of the self-propelled device according to the second embodiment coincides with the goal point B.
Figure 48:
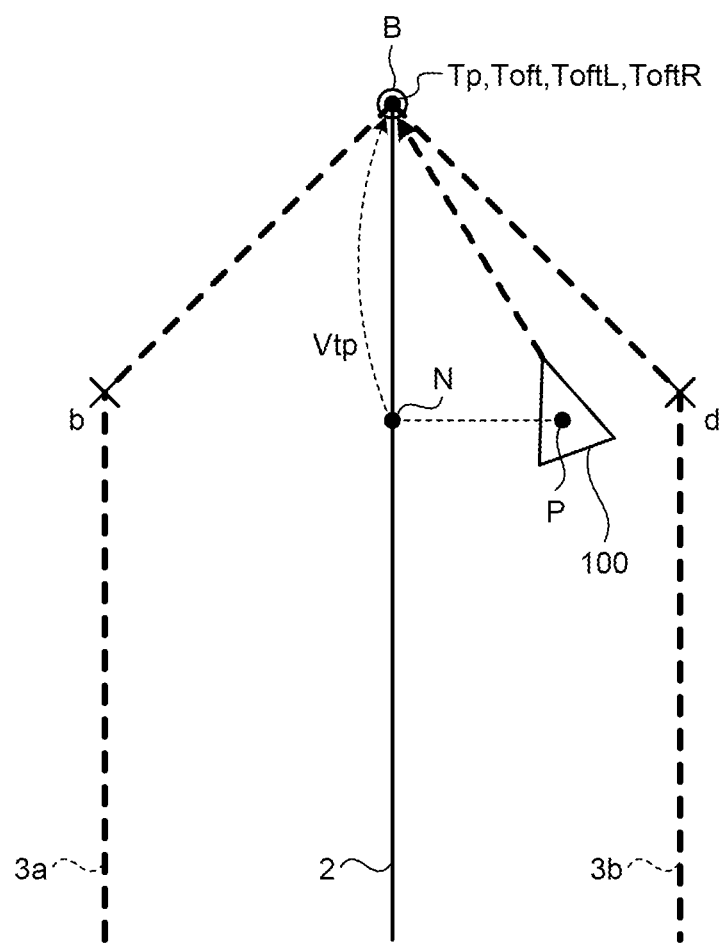
FIG. 48 is a conceptual diagram when the position P of the self-propelled device according to the second embodiment is ahead of the position illustrated in FIG. 47.
Figure 49:
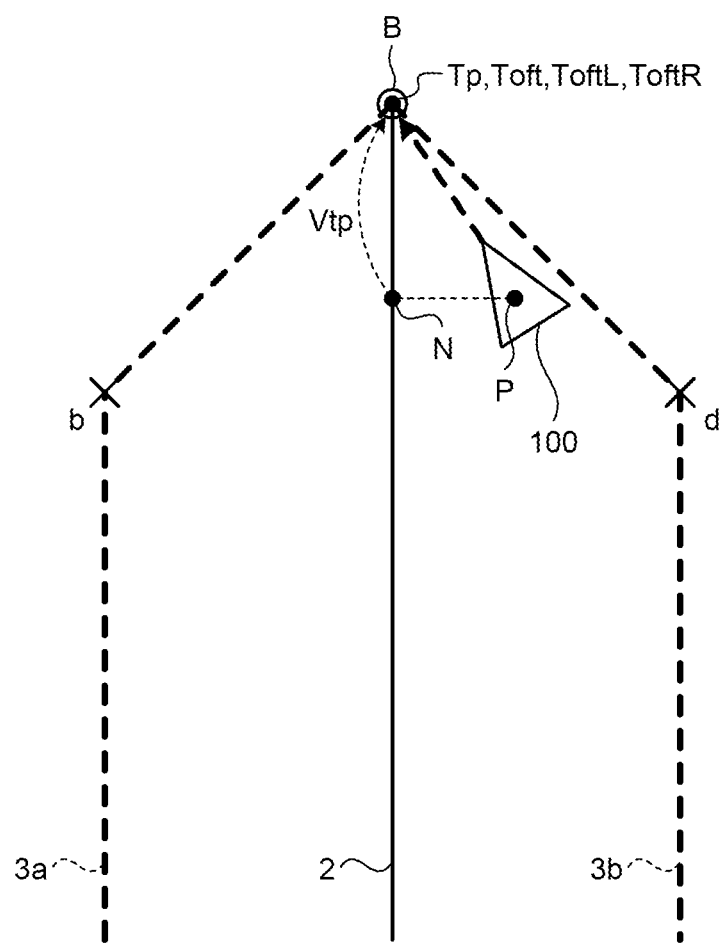
FIG. 49 is a conceptual diagram when the position P of the self-propelled device according to the second embodiment is further ahead of the position illustrated in FIG. 48.
Figure 50:
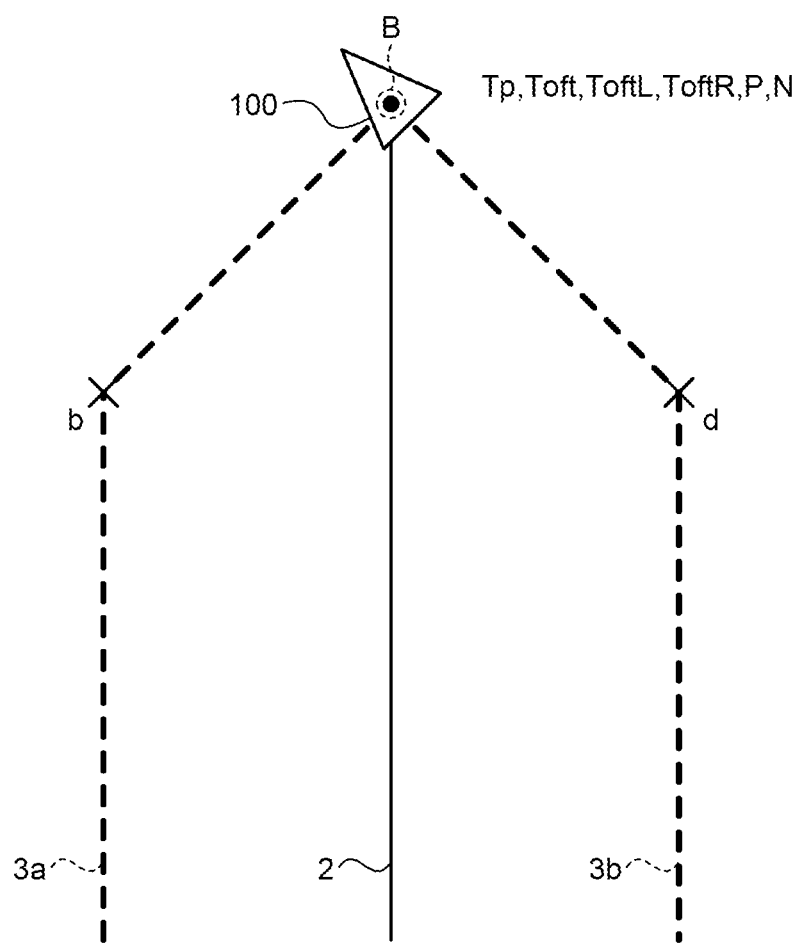
FIG. 50 is a conceptual diagram when the position P of the self-propelled device according to the second embodiment coincides with the goal point B.

FIG. 44 is a conceptual diagram when the offset point Toft of the self-propelled device according to the second embodiment coincides with the goal point B. FIG. 45 is a conceptual diagram when the position P of the self-propelled device according to the second embodiment is ahead of the position illustrated in FIG. 44. FIG. 46 is a conceptual diagram when the position P of the self-propelled device according to the second embodiment is further ahead of the position illustrated in FIG. 45. FIG. 47 is a conceptual diagram when the offset reference point Tp of the self-propelled device according to the second embodiment coincides with the goal point B. FIG. 48 is a conceptual diagram when the position P of the self-propelled device according to the second embodiment is ahead of the position illustrated in FIG. 47. FIG. 49 is a conceptual diagram when the position P of the self-propelled device according to the second embodiment is further ahead of the position illustrated in FIG. 48. FIG. 50 is a conceptual diagram when the position P of the self-propelled device according to the second embodiment coincides with the goal point B.

As illustrated in FIG. 44, when the offset point Toft of the self-propelled device 100 coincides with the goal point B, the right target point ToftR coincides with Position d. In other words, the distance on the virtual path 2 from the goal point B to the intersection point of the virtual path 2 and the straight line passing through Position d and which is orthogonal to the virtual path 2 is equal to the initial offset amount Voft (refer to FIG. 25).

The offset point Toft and the offset reference point Tp converge to the goal point B. In other words, as illustrated in FIGS. 45 and 46, Expression (4) described above indicates that, after the distance between the offset reference point Tp and the goal point B becomes smaller than the initial offset amount Voft (R<Voft), the locus 3b of the right target point ToftR moves on the straight line connecting Position d and the goal point B, and when the offset reference point Tp coincides with the goal point B, the right target point ToftR coincides with the goal point B as illustrated in FIG. 47. Thereafter, the position P of the self-propelled device 100 approaches the right target point ToftR at the goal point B as illustrated in FIGS. 48 and 49, the position P of the self-propelled device 100 coincides with the goal point B as illustrated in FIG. 50, and the self-propelled device 100 stops.

In this manner, the self-propelled device 100 according to the second embodiment can constantly travel the right side of the virtual path 2 from the start point A to the goal point B and reach the goal point B.

In the above-described example, the left target point ToftL is determined, but no left target point ToftL may be determined when the self-propelled device 100 is set in advance to travel on the right side of the virtual path 2. In other words, the locus 3a of the left target point ToftL, which is illustrated in FIGS. 40 to 50, is not necessarily needed when traveling is set to be made on the right side of the virtual path 2.

As illustrated in FIG. 25, Position a and Position c are determined depending on the initial value Vtp. Thus, when the initial value Vtp is too large, the traveling path of the self-propelled device 100 cannot be effectively set on the left side (or on the right side) in some cases. Position b and Position d are determined depending on the initial offset amount Voft. Thus, the initial value Vtp is preferably equivalent to the initial offset amount Voft.

As described above, the method of controlling traveling of the self-propelled device 100 according to the second embodiment includes: a first step of estimating the position of the self-propelled device 100; a second step of determining the intersection point N of the virtual path 2 connecting the start point A and the goal point B and the straight line passing through the position of the self-propelled device 100 and which is orthogonal to the virtual path 2; a third step of determining the offset reference point Tp between the intersection point N and the goal point B on the virtual path 2; a fourth step of determining the offset point Toft at an offset on the goal point B side from the offset reference point Tp on the virtual path 2; a fifth step of determining at least a target point (the left target point ToftL or the right target point ToftR) reached by rotating the offset point Toft by 90° about the offset reference point Tp in one of the anticlockwise direction and the clockwise direction; and a sixth step of causing the self-propelled device to travel toward the target point (the left target point ToftL or the right target point ToftR).

The self-propelled device 100 according to the second embodiment includes: the position estimation unit 102 configured to estimate the position of the self-propelled device 100; the travel unit 103 configured to move the self-propelled device 100; and the control unit 101 configured to determine the intersection point N of the virtual path 2 connecting the start point A and the goal point B and the straight line passing through the position of the self-propelled device 100 and which is orthogonal to the virtual path 2, determine the offset reference point Tp between the intersection point N and the goal point B on the virtual path 2, determine the offset point Toft at an offset on the goal point B side from the offset reference point Tp on the virtual path 2, determine at least a target point (the left target point ToftL or the right target point ToftR) reached by rotating the offset point Toft by 90° about the offset reference point Tp in one of the anticlockwise direction and the clockwise direction, and control the travel unit 103 so that the self-propelled device 100 travels toward the target point (the left target point ToftL or the right target point ToftR).

The computer program executed by a computer to control traveling of the self-propelled device 100 according to the second embodiment includes: a first step of estimating the position of the self-propelled device 100; a second step of determining the intersection point N of the virtual path 2 connecting the start point A and the goal point B and the straight line passing through the position of the self-propelled device 100 and which is orthogonal to the virtual path 2; a third step of determining the offset reference point Tp between the intersection point N and the goal point B on the virtual path 2; a fourth step of determined the offset point Toft at an offset on the goal point B side from the offset reference point Tp on the virtual path 2; a fifth step of determining at least a target point (the left target point ToftL or the right target point ToftR) reached by rotating the offset point Toft by 90° about the offset reference point Tp in one of the anticlockwise direction and the clockwise direction; and a sixth step of causing the self-propelled device to travel toward the target point (the left target point ToftL or the right target point ToftR).

The storage medium stores the travel control computer program executed by a computer and including: a first step of estimating the position of the self-propelled device 100; a second step of determining the intersection point N of the virtual path 2 connecting the start point A and the goal point B and the straight line passing through the position of the self-propelled device 100 and which is orthogonal to the virtual path 2; a third step of determining the offset reference point Tp between the intersection point N and the goal point B on the virtual path 2; a fourth step of determining the offset point Toft at an offset on the goal point B side from the offset reference point Tp on the virtual path 2; a fifth step of determining at least a target point (the left target point ToftL or the right target point ToftR) reached by rotating the offset point Toft by 90° about the offset reference point Tp in one of the anticlockwise direction and the clockwise direction; and a sixth step of causing the self-propelled device to travel toward the target point (the left target point ToftL or the right target point ToftR).

With these configurations, the self-propelled device 100 is capable of autonomously traveling on a traveling path at an offset on the left or on the right of one the virtual path 2 without providing, for example, an outgoing path and a returning path between two points.

Moreover, there is no need to generate a plurality of paths, which results in reduction of a load due to path generation.

In this manner, the above-described embodiments provide a self-propelled device capable of autonomously traveling on the left side or right side of one virtual path connecting two points, a method of controlling traveling of the self-propelled device, and a computer program of controlling traveling of the self-propelled device.

REFERENCE SIGNS LIST 1 corridor
2 virtual path
3a, 3b target point loci
11 operation unit
12 display unit
13 transmission-reception unit
100 self-propelled device
101 control unit
102 position estimation unit
103 travel unit
103a wheel
104 path generation unit
105 storage unit
106 input-output unit
R offset amount
Toft offset point
Toft1 front-side offset point
Toft2 back-side offset point
ToftL left target point
ToftR right target point
Tp offset reference point
Voft initial offset amount
VoftL first initial offset amount
VoftR second initial offset amount
Vtp initial value

The invention claimed is:

1. A method of controlling traveling of a self-propelled device capable of autonomously traveling from a start point to a goal point, the method comprising:
a first step of estimating a position of the self-propelled device;
a second step of determining an intersection point of a virtual path and a straight line, the virtual path connecting the start point and the goal point, and the straight line passing through the position of the self-propelled device and which is orthogonal to the virtual path;
a third step of determining an offset reference point between the intersection point and the goal point on the virtual path;
a fourth step of determining at least an offset point at an offset on one of a side of the goal point and a side of the start point of the offset reference point on the virtual path;
a fifth step of determining at least a target point reached by rotating the offset point by 90° about the offset reference point in one of an anticlockwise direction and a clockwise direction; and
a sixth step of causing the self-propelled device to travel toward the target point.

2. The method of controlling traveling of the self-propelled device according to claim 1, wherein the fifth step determines a target point reached by rotating the offset point by 90° about the offset reference point in the anticlockwise direction.

3. The method of controlling traveling of the self-propelled device according to claim 2, wherein, when the self-propelled device is set in advance to travel on a left side of the virtual path:
the fourth step determines at least a front-side offset point at an offset on the side of the goal point of the offset reference point on the virtual path;
the fifth step determines a left target point reached by rotating the front-side offset point by 90° about the offset reference point in the anticlockwise direction; and
the sixth step causes the self-propelled device to travel toward the left target point.

4. The method of controlling traveling of the self-propelled device according to claim 2, wherein, when the self-propelled device is set in advance to travel on a right side of the virtual path:
the fourth step determines at least a back-side offset point at an offset on the side of the start point of the offset reference point on the virtual path;
the fifth step determines a right target point reached by rotating the back-side offset point by 90° about the offset reference point in the anticlockwise direction; and
the sixth step causes the self-propelled device to travel toward the right target point.

5. The method of controlling traveling of the self-propelled device according to claim 3, wherein a distance from the offset reference point to the front-side offset point is equal to or smaller than a distance from the intersection point to the offset reference point on the virtual path.

6. The method of controlling traveling of the self-propelled device according to claim 4, wherein a distance from the offset reference point to the back-side offset point is equal to or smaller than a distance from the intersection point to the offset reference point on the virtual path.

7. The method of controlling traveling of the self-propelled device according to claim 1, wherein the fourth step determines an offset point at an offset on the side of the goal point of the offset reference point on the virtual path.

8. The method of controlling traveling of the self-propelled device according to claim 7, wherein, when the self-propelled device is set in advance to travel on a left side of the virtual path:
the fifth step determines a left target point reached by rotating the offset point by 90° about the offset reference point in the anticlockwise direction; and
the sixth step causes the self-propelled device to travel toward the left target point.

9. The method of controlling traveling of the self-propelled device according to claim 7, wherein, when the self-propelled device is set in advance to travel on a right side of the virtual path:
the fifth step determines a right target point reached by rotating the offset point by 90° about the offset reference point in the clockwise direction; and
the sixth step causes the self-propelled device to travel toward the right target point.

10. The method of controlling traveling of the self-propelled device according to claim 7, wherein a distance from the offset reference point to the offset point is equal to or smaller than a distance from the intersection point to the offset reference point on the virtual path.

11. The method of controlling traveling of the self-propelled device according to claim 1, wherein the offset reference point and the offset point converge to the goal point as the self-propelled device approaches the goal point.

12. A self-propelled device capable of autonomously traveling from a start point to a goal point, the self-propelled device comprising:
a wheel, a drive device, and a sensor, the wheel, the drive device, and the sensor configured to move the self-propelled device; and
a control unit configured to:
estimate a position of the self-propelled device,
determine an intersection point of a virtual path and a straight line, the virtual path connecting the start point and the goal point, and the straight line passing through the position of the self-propelled device and which is orthogonal to the virtual path,
determine an offset reference point between the intersection point and the goal point on the virtual path,
determine at least an offset point at an offset on one of the side of the goal point and the side of the start point of the offset reference point on the virtual path,
determine at least a target point reached by rotating the offset point by 90° about the offset reference point in one of an anticlockwise direction and a clockwise direction, and
control the travel circuit so that the self-propelled device travels toward the target point.

13. The self-propelled device according to claim 12, wherein, when the self-propelled device is set in advance to travel on a left side of the virtual path, the control unit determines at least a front-side offset point at an offset on the side of the goal point of the offset reference point on the virtual path, determines a left target point reached by rotating the front-side offset point by 90° about the offset reference point in the anticlockwise direction, and controls the travel circuit so that the self-propelled device travels toward the left target point.

14. The self-propelled device according to claim 12, wherein, when the self-propelled device is set in advance to travel on a right side of the virtual path, the control unit determines at least a back-side offset point at an offset on the side of the start point of the offset reference point on the virtual path, determines a right target point reached by rotating the back-side offset point by 90° about the offset reference point in the anticlockwise direction, and controls the travel circuit so that the self-propelled device travels toward the right target point.

15. The self-propelled device according to claim 13, wherein a distance from the offset reference point to the front-side offset point is equal to or smaller than a distance from the intersection point to the offset reference point on the virtual path.

16. The self-propelled device according to claim 14, wherein a distance from the offset reference point to the back-side offset point is equal to or smaller than a distance from the intersection point to the offset reference point on the virtual path.

17. The self-propelled device according to claim 12, wherein, when the self-propelled device is set in advance to travel on a left side of the virtual path, the control unit determines an offset point at an offset on the side of the goal point of the offset reference point on the virtual path, determines a left target point reached by rotating the offset point by 90° about the offset reference point in the anticlockwise direction, and controls the travel circuit so that the self-propelled device travels toward the left target point.

18. The self-propelled device according to claim 12, wherein, when the self-propelled device is set in advance to travel on a right side of the virtual path, the control unit determines an offset point at an offset on the side of the goal point of the offset reference point on the virtual path, determines a right target point reached by rotating the offset point by 90° about the offset reference point in the clockwise direction, and controls the travel circuit so that the self-propelled device travels toward the right target point.

19. The self-propelled device according to claim 17, wherein a distance from the offset reference point to the offset point is equal to or smaller than a distance from the intersection point to the offset reference point on the virtual path.

20. The self-propelled device according to claim 12, wherein the offset reference point and the offset point converge to the goal point as the self-propelled device approaches the goal point.

21. A non-transitory computer readable recording medium storing therein a control program executed by a processor to control traveling of a self-propelled device capable of autonomously traveling from a start point to a goal point, the control program causing the processor to perform:
a first step of estimating a position of the self-propelled device;
a second step of determining an intersection point of a virtual path and a straight line, the virtual path connecting the start point and the goal point, and the straight line passing through the position of the self-propelled device and which is orthogonal to the virtual path;
a third step of determining an offset reference point between the intersection point and the goal point on the virtual path;
a fourth step of determining at least an offset point at an offset on one of the side of the goal point and the side of the start point of the offset reference point on the virtual path;
a fifth step of determining at least a target point reached by rotating the offset point by 90° about the offset reference point in one of an anticlockwise direction and a clockwise direction; and
a sixth step of causing the self-propelled device to travel toward the target point.

\* \* \* \* \*